US012647408B2

(12) United States Patent 
Buchner et al.

(10) Patent No.: US 12,647,408 B2 
(45) Date of Patent: Jun. 2, 2026

(54) CONTRIBUTOR VERIFICATION IN A DECENTRALIZED NETWORK

(71) Applicant: Block, Inc., San Francisco, CA (US)

(72) Inventors: Daniel Buchner, Austin, TX (US); Joseph Seiler, Los Angeles, CA (US); Kara Lee, New York, NY (US)

(73) Assignee: Block, Inc., Oakland, CA (US)

( * ) Notice: Subject to any disclaimer, the term of this patent is extended or adjusted under 35 U.S.C. 154(b) by 287 days.

(21) Appl. No.: 18/450,151

(22) Filed: Aug. 15, 2023

(65) Prior Publication Data

US 2024/0388579 A1 Nov. 21, 2024

Related U.S. Application Data

(60) Provisional application No. 63/467,268, filed on May 17, 2023.

(51) Int. Cl.
   *H04L 29/06* (2006.01)
   *H04L 9/40* (2022.01)
(52) U.S. Cl.
   CPC .......... *H04L 63/083* (2013.01); *H04L 63/123* (2013.01)

(58) Field of Classification Search
   CPC ........................... H04L 63/083; H04L 63/123
   See application file for complete search history.

(56) References Cited

U.S. PATENT DOCUMENTS

2022/0329653 A1* 10/2022 Govindarajan ......... H04L 67/51
2023/0104103 A1* 4/2023 Eby .................... G06Q 20/3678
                                                                       705/69

* cited by examiner

*Primary Examiner* — Wasika Nipa 
(74) *Attorney, Agent, or Firm* — IP Spring

(57) ABSTRACT

A digital content contribution verification system in a decentralized network is described. In an implementation, digital content is obtained and a plurality of portions are located from the digital content. A decentralized identifier and verifiable credential are identified as associated with a respective portion of the plurality of portions. The decentralized identifier is resolvable to a respective node from a decentralized network of nodes individually configured to store, receive, and transmit data. Representations are displayed of the decentralized identifiers indicative of a respective entity and corresponding verifiable credentials validating a relationship of the respective entity with the respective portion.

15 Claims, 14 Drawing Sheets

200

400

500

600

700

800

900

902
Access an item of digital content having multiple contributors at a decentralized node associated with the client device, the decentralized node being one of multiple decentralized nodes in a decentralized network

904
Display a user interface including one or more roles that are selectable to assign a decentralized identifier associated with a decentralized node as a contributor of the multiple contributors to the one or more roles

906
Receive a selection of a role of the one or more roles to assign the decentralized identifier as a contributor to the item of digital content

908
Send a request a credential issuer system for a verifiable credential to verify that the decentralized identifier is the contributor to the selected role

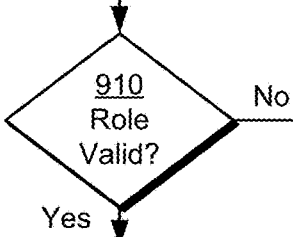

910
Role
Valid?

No

Yes

912
Receive the verifiable credential from the credential issuer system

914
Store the verifiable credential and the decentralized identifier as the contributor to the role in metadata associated with the item of digital content at the decentralized node

916
Transmit, in response to receiving a request to access the contributor of the role of the digital content item, the metadata identifying the decentralized identifier as the contributor to the role and the verifiable credential

Fig. 9

1000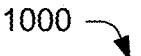

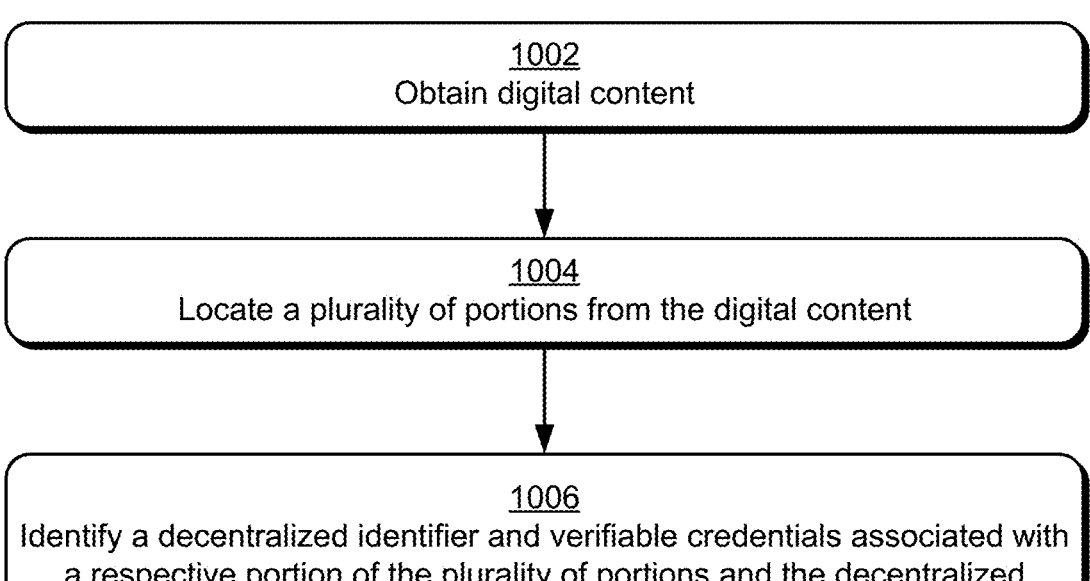

1002
Obtain digital content

1004
Locate a plurality of portions from the digital content

1006
Identify a decentralized identifier and verifiable credentials associated with a respective portion of the plurality of portions and the decentralized identifier is resolvable to a respective node from a decentralized network of nodes individually configured to store, receive, and transmit data

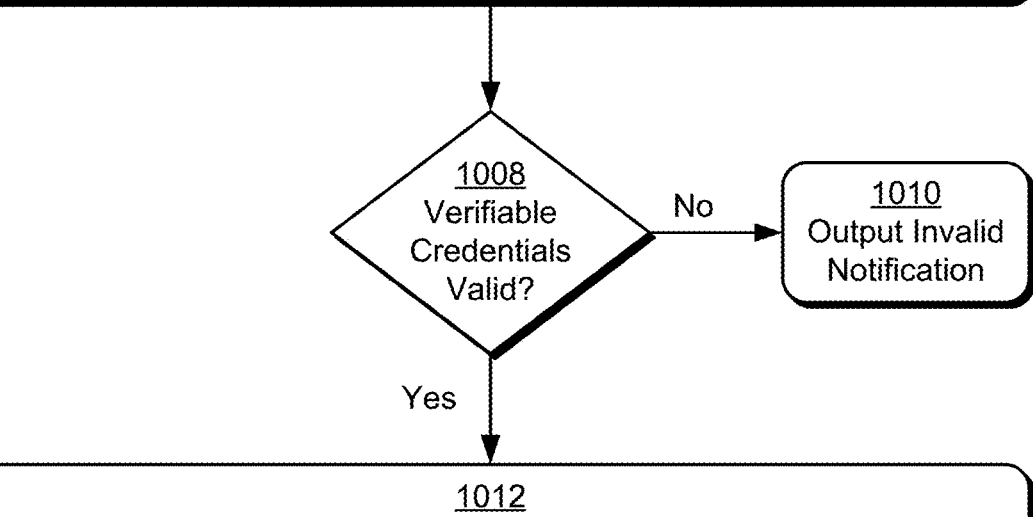

1008
Verifiable Credentials Valid?

No → 1010 Output Invalid Notification

Yes

1012
Display representations of the decentralized identifiers indicative of a respective entity and corresponding verifiable credentials validating a relationship of the respective entity with the respective portion

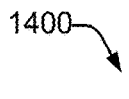

Server 1404

Processors 1428

Input/Output Devices 1432

Communication Interfaces 1434

Computer-Readable Media 1430

Merchant Component 1436

Training Component 1438

Other Components and Data 1440

Operating System 1442

Data Store 1444

1406

User Device 1402

Processors 1408

Communication Interfaces 1412

Input/Output Devices 1414

Display 1416

Sensor 1418

Computer-Readable Media 1410

User Interface 1420 (e.g., Web Browser, Application, etc.)

Other Components and Data 1422

Operating System 1424

Reader Device 1426

Fig. 14

CONTRIBUTOR VERIFICATION IN A DECENTRALIZED NETWORK

RELATED APPLICATIONS

This application claims priority under 35 U.S.C. § 119(e) to U.S. Provisional Application No. 63/467,268, filed May 17, 2023, and titled "Contributor Verification in a Decentralized Network," the entire disclosure of which is hereby incorporated by reference.

TECHNICAL FIELD

Decentralized networks provide a variety of functionality in connection with implementing and securely transferring various digital assets, examples of which include cryptocurrencies and cryptographic-based tokens. Additional functionalities have been developed that leverage decentralized networks, examples of which include use of decentralized identifiers (DIDs) and verifiable credentials (VCs).

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 9 is a flow diagram depicting a step-by-step procedure in a non-limiting example implementation of operations and algorithms performable by a processing device for accomplishing a result of verifying contributions of contributors towards creation of digital content according to an implementation of the present subject matter.

FIG. 10 is a flow diagram depicting a step-by-step procedure in a non-limiting example implementation of operations and algorithms performable by a processing device for accomplishing a result of accessing verifiable credentials to identify contributors in creating an item of digital content according to an implementation of the present subject matter.

FIG. 14 is a non-limiting example illustrating an environment in which recommendation techniques described herein are performed in accordance with one or more implementations.

DETAILED DESCRIPTION

Overview

Figure 1:
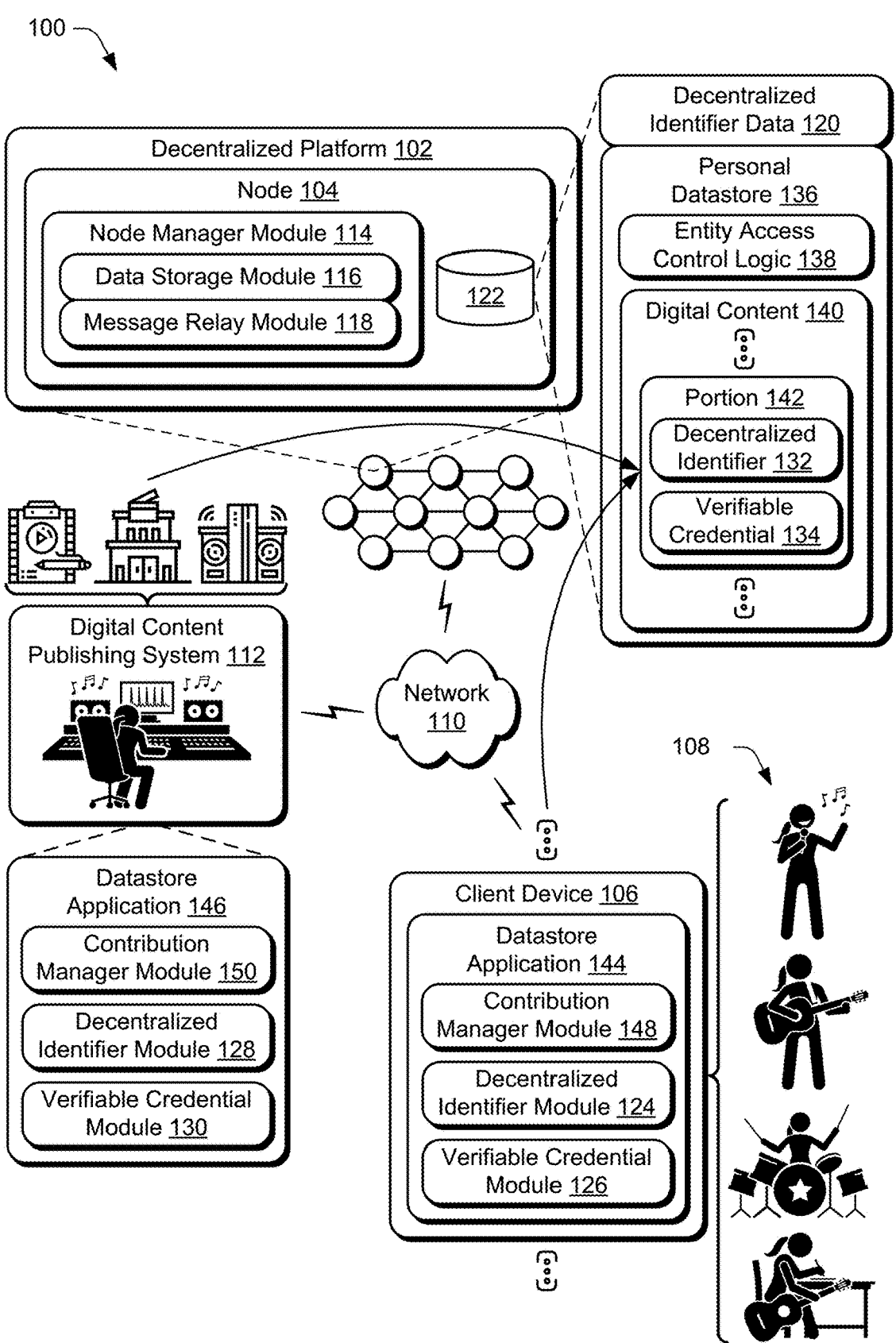
FIG. 1 is a non-limiting illustration of an example system that is operable to implement digital content contributor verification in a decentralized network as described herein according to an implementation of the present subject matter.

Attribution of artists and other entities (e.g., sound engineers, music labels, venues) with corresponding contributions as part of digital content creation is difficult to achieve in real world scenarios. In a digital content scenario, for instance, it is difficult to determine which entities contributed towards respective parts of a given item of digital content. Conventional techniques, for instance, that are exposed to consumers typically rely on an "all or nothing" approach in which contributions of a pool of entities are attributed to an entirety of a piece of digital content, e.g., to a track of music as a whole. Consequently, subsequent uses of different portions of that piece of music are attributed to the pool of entities.

Additionally, even when entities are identified as corresponding to a particular item of digital content, it is still difficult in conventional scenarios to accurately identify an actual entity that made a contribution. When providing an item of digital content to a digital service provider, for instance, the contributors may be identified using a list of names that are difficult to resolve to an individual entity. This challenge is further complicated in situations in which the identified name may or may not be an artist's actual legal name and when two entities having similar roles share a same or similar name. Consequently, contributor information associated with digital content in conventional systems is unstandardized, making downstream uses of the digital content and identification of the contributors computationally burdensome. Therefore, conventional scenarios are technically challenged due to these non-standardized formats and thus are hindered from sharing information between the entities, resulting in computational and data transfer inefficiencies.

To address the above technical challenges, decentralized identifiers and verifiable credentials are used for verification of entities involved in content creation. Decentralized identifiers (DIDs) are a mechanism to control an entity's digital identity in a decentralized environment. Typically, an entity has free reign over the use of a corresponding decentralized identifier, what information is stored in association with the decentralized identifier, how the decentralized identifier is used for interaction with other entities, etc. Verifiable credentials (VCs) are standardized digital representations of assertions and attestations made about a subject. Verifiable credentials support an ability to prove aspects of the decentralized identifier and are usable to control data access.

Decentralized identifiers, for instance, are used to identify a respective entity through use of an identifier that is globally unique and is cryptographically verifiable. Decentralized identifiers, for instance, are usable to represent artists, labels, rights holders, items of digital content, and so on. Decentralized identifiers are configurable through a decentralized platform (e.g., using a blockchain or other distributed ledger technique implemented as part of a decentralized platform) to securely authenticate an identity of a corresponding entity.

Verifiable credentials are usable to validate a claim made by a corresponding entity, e.g., associated with a decentralized identifier as described above. Verifiable credentials, for instance, include a cryptographic proof that is usable to validate authenticity of the credential, e.g., through communication with a credential issuer system that issued the verifiable credentials. Verifiable credentials are configurable to support standardization of qualifications, affiliations, privileges, or other claims about or made by a corresponding decentralized identity. Accordingly, a decentralized identity acts as a subject of the verifiable credentials that is authenticated to validate that the entity "is who they say they are" and the verifiable credentials support an assertion made by the entity, either by that entity or a third-party issuer.

In a digital content scenario, attribution is supported through use of decentralized identifiers to sign portions of an item of content, e.g., a track of music. The decentralized identifiers, for instance, may be utilized as a unique identifier of an entity that contributed to an item of digital content. Verifiable credentials are then utilized to validate the entity "is who they say they are" as well as validate the asserted contribution, e.g., participated in "X" role in contributing towards creation of the digital content. These techniques are usable in a variety of scenarios, including digital content creation scenarios to create digital music, digital videos, digital artwork, digital documents, and so forth.

The decentralized identifiers, in one or more implementations, are maintained as metadata associated with the item of digital content, e.g., associated with respective timestamps within the track at which an individual associated with a decentralized identifier contributed to the track. The decentralized identifiers and verifiable credentials are thus usable to indicate an entity is associated with a corresponding portion and through use of the verifiable credentials an assertion describing a relationship of that entity to that corresponding portion. A singer, for instance, uses the decentralized identifier to sign corresponding portions of an item of digital content. Likewise, a recording studio may also sign corresponding portions indicating when and where the tracks were recorded through a corresponding decentralized identifier.

The verifiable credentials are further usable to attest to assertions (e.g., contributions) made by the entities in relation to an item of digital content. An artist, for instance, may associate a decentralized identifier with a track of audio and indicate a particular role from a multitude of roles (e.g., is a singer) through use of a verifiable credential. A recording studio may also act as a credential issuer system to provide additional verifiable credentials to attest that the assertion made by the artist is true, e.g., that decentralized identifier is associated with a contribution indicated by the verifiable credential. In this way, the additional verifiable credentials provide an additional degree of trust to the assertion made by the artist as well as to the identification of the artist. In examples, assertions of contributions may be withheld until a credential is verified by a third-party issuer, and updated as part of the digital content item when the credential is verified (e.g., in real time), such as in a standardized format that is consumable by entities utilizing the digital content in various ways and as such overcome conventional technical issues caused non-standardized formats.

The signed portions are then usable to support a variety of functionalities. In a first example, a user interface supports output of representations of entities associated with respective portions of content based on the decentralized identifiers. Verifiable credentials are usable to specify a relationship that is attested to for a respective decentralized identifier, e.g., singer, sound technician, editor, and so forth. The representations are then usable, through related decentralized identifiers, to obtain additional information about the entities. An artist, for instance, may maintain additional fan data via a personal datastore maintained on a node in a decentralized network that is accessible via the decentralized identifier of the artist.

In another example, the signed portions are used to monitor for events that implement a trigger through use of the decentralized identifiers and verifiable credentials. The decentralized identifiers, for instance, may describe a particular entity. Verifiable credentials, on the other hand, are used to specify events and/or triggers associated with that entity to particular portions of the item of digital content, the item of digital content as a whole, and so forth. Examples of which include an ability to attest to ownership of particular portions for a particular amount of time, e.g., as a rights holder to control dissemination of the digital content for the first three months of release of the digital content. A variety of different entities as contributors may attest to a variety of different contributions towards digital content creation. Examples of contributors include record labels, venues, recording studios, other contributing artists, composers, videographers, songwriters, agents, manufacturers, managers, and so on.

Temporal aspects may also be addressed through use of verifiable credentials. Entities, for instance, may sign at different stages of content creation, e.g., from writing, to recording, to distribution, and so forth and thus are informed when these different stages occur, which is not possible in conventional techniques. Versioning may also be leveraged by maintaining different versions and related verifiable credentials as the digital content is created over time as associated with the verifiable credentials and corresponding decentralized identifiers. As a result, the decentralized identifiers and verifiable credentials are also usable to document the content creation process, which provides additional protection against appropriation or other copyright claims.

In one or more examples, an item of digital content is accessed by a client device. The item of digital content is accessible from a variety of different sources, examples of which include a personal datastore maintained at a decentralized node of a decentralized network, locally on a client device, remotely over a network from a digital content streaming service, and so forth. The digital content in this example is associated with multiple contributors.

A user interface is displayed that includes one or more roles that are selectable to assign a decentralized identifier associated with a decentralized node as a contributor of multiple contributors to the one or more roles. The client device, for instance, may identify the roles automatically and without user intervention through examination of the digital content itself, metadata associated with the digital content, and so forth. In one or more examples, a machine-learning model is used to identify different contributions included in the digital content (e.g., different types of musical instruments) and surface (e.g., display) representations of roles in the user interface as corresponding to the contributions.

The client device may also leverage additional information included in the metadata as part of identification of the roles. The client device, for instance, detects inclusion of a decentralized identifier and/or verifiable credential as part of metadata already associated with the item of digital content. The detected decentralized identifier and/or verifiable credential is then usable to locate other associated decentralized identifiers or verifiable credentials. Detection of a decentralized identifier of a sound engineer, for instance, is usable to auto populate a decentralized identifier of a recording studio associated with the sound engineer, e.g., based on a social media data, global positioning system (GPS) data provided by a device associated with the sound engineer, and/or other data.

In some cases, a machine-learning model may use existing decentralized identifiers and/or VCs associated with an item of digital content as inputs to generate a prediction of a particular contributor to the content item. The machine-learning model, for instance, is configurable to generate candidate contributors and surface these candidates in a user interface for input of corresponding verifiable credentials to attest to respective contributions. In an illustrative example, one or more machine-learning models may process an item of digital content (e.g., through use of feature extraction), metadata associated with the item of digital content, and/or existing verifiable credentials and/or decentralized identifiers as an input and predict a decentralized identifier associated with a particular contributor who provided the contribution to the item of digital content based on the inputs.

In a self-signing scenario, a first entity indicates a corresponding contribution to a respective item of digital content, e.g., is a "singer," "author," or so forth. Verifiable credentials are then utilized to attest to this contribution, which may originate from the first entity and/or involve a second entity. The first entity, for instance, may self-sign the item of digital content using a corresponding verifiable credential that is issued by the first entity to attest to a particular contribution (e.g., role) in the creation of the item of digital content. Therefore, in this example the entity has provided self-verification. Accordingly self-verification leverages an amount of trust that is associated with the self-signing entity. This amount of trust may also be increased through use of verifiable credentials from additional entities. For example, a digital content publishing system may further sign the attestation made by the signer through use of a decentralized identifier and verifiable credential to further bolster the claim made by the artist, e.g., the artist composed the item of digital content as attested by the digital content publishing system. A variety of other scenarios are also contemplated, further discussion of which may be found in the following description.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

FIG. 1 is a non-limiting illustration of an example system 100 that is operable to implement digital content contributor verification in a decentralized network as described herein according to an implementation of the present subject matter. The illustrated system 100 includes a decentralized platform 102 implemented using a plurality of nodes (e.g., web nodes, decentralized nodes), an example of which is illustrated as node 104. The node 104 is representative of a computer or other device involved in implementation of a decentralized network, e.g., tasked with validating transactions and maintaining a copy of a blockchain ledger. The system 100 also includes a client device 106 as representative of functionality available at an "edge" of the system 100 to respective entities 108, e.g., via respective computing devices.

The node 104 of the decentralized platform and the client device 106 are communicatively coupled, one to another, via a network 110. The client device 106, for instance, includes a communication system that includes hardware and software functionality to support network communication, e.g., including a modem, browser, a network-enabled application, an applet, and so forth. Likewise, the system 100 also includes a digital content publishing system 112 that is implemented using one or more computing devices.

Computing devices that implement the system 100 (e.g., the client device 106 and/or the digital content publishing system 112) are configurable in a variety of ways. A computing device, for instance, is configurable as a server, a desktop computer, a laptop computer, a mobile device (e.g., assuming a handheld configuration such as a tablet or mobile phone), an IoT device, a wearable device (e.g., a smart watch), an AR/VR device, and so forth. Thus, a computing device ranges from full resource devices with substantial memory and processor resources to low-resource devices with limited memory and/or processing resources. Although in instances in the following discussion reference is made to a computing device in the singular, a computing device may also represent any number of different computing devices, such as multiple servers of a server farm utilized to perform operations "over the cloud" as part of a service provider system.

The node 104 includes a node manager module 114 having functionality in support of communication and message relay between the nodes 104 of the decentralized platform 102 as well as with the client device 106 and the digital content publishing system 112 via the network 110. Examples of functionality to do so include a data storage module 116 and a message relay module 118. The data storage module 116 is configured to collect and maintain decentralized identifier data 120, which is illustrated as maintained in a storage device 122. The decentralized identifier data 120 is formatted to support decentralized authentication and routing as performed by the message relay module 118, e.g., for communication between nodes and/or with the client device 106 and digital content publishing system 112 via the network 110.

The client device 106 includes a decentralized identifier module 124 and a verifiable credential module 126. Likewise, the digital content publishing system 112 also includes a decentralized identifier module 128 and a verifiable credential module 130. The decentralized identifier modules 124, 128 are configured to manage use of decentralized identifiers 132 and the verifiable credential modules 126, 130 are configured to manage use of verifiable credentials 134.

Decentralized identifiers 132 are configured as a self-owned identifier that supports decentralized authentication and routing. A self-owned identifier in a blockchain network is a unique identifier that is owned and controlled by an individual entity (e.g., on a blockchain), also referred to as a "self-sovereign identity," as contrasted with an entity controlled by a centralized authority (e.g., service provider system) that is vulnerable to attacks, hacks, and data breaches. The decentralized identifiers 132 are configurable without use of subjective consensus as implemented using a conventional centralized service provider, but rather are self-generated and self-owned. Persistence of the decentralized identifiers 132 is maintainable via local storage and are resistant to interruption or stoppage by outside forces or authorities. Decentralized identifiers 132 are also universally indexed and discoverable as part of the decentralized identifier data 120.

The verifiable credentials 134 employ a data format for cryptographic presentation and verification of claims. Verifiable credentials 134, for instance, support standardized mechanisms to express and verify qualifications, privileges, and other assertions made by an entity, e.g., via a corresponding decentralized identifier. For example, verifiable credentials 134 are usable to provide a digital version of physical credentials such as a passport, driver's license, and the like. An issuing authority generates the verifiable credential as having a cryptographic proof that is employed to verify authenticity of the verifiable credential. An entity that possesses the verifiable credentials 134 may then present the credentials to another entity (e.g., a verifier) as proof of an assertion. The other entity may then use the cryptographic proof to ensure validity of the credential, e.g., was issued by a corresponding credential issuer system.

The node 104 of the decentralized platform 102, as representative of one of a plurality of decentralized nodes (e.g., decentralized web nodes), supports data storage and relays that allows entities, service provider systems, individuals, organizations and so forth to send, store, and receive encrypted or public messages and data. The node 104 is universally addressable and is "crawlable" using data addressing in relation to the decentralized identifiers. The node 104 is also configured to support decentralized replication of data across the nodes that is "eventually consistent" (e.g., the data is consistent across the nodes over time through continued data communication between the nodes) through communication of instances across individual nodes in the decentralized platform 102. The node 104 supports secure encryption through use of a cryptographic key associated with an individual's decentralized identifier.

The node 104 is further configured to implement a personal datastore 136 having entity access control logic 138. The personal datastore 136 is configured to support control by the entity 108 and/or the digital content publishing system 112 of digital content 140 having a plurality of portions 142 in this example, e.g., using decentralized identifiers 132 and verifiable credentials 134. The digital content 140 may be configured to store a variety of data, such as text, images, video, audio, digital documents, and so forth. A "portion" 142 may correspond to a part of a song (e.g., intro, verse, chorus, bridge, outro, etc.), a musical component of the song (e.g., singing, speaking, musical instrument playing, electronic music generating, etc.), a compositional component of a song or video (e.g., written compositions for musical instruments and/or vocals, scripts, etc.), time durations of the digital content, appearance (auditory or visual) in a video, or any combinations of these examples or others that may be suitable for various use cases.

As part of this, the client device 106 includes a datastore application 144 that leverages functionality of the decentralized identifier module 124 and the verifiable credential module 126. The digital content publishing system 112 also includes a datastore application 146 that leverages a corresponding decentralized identifier module 128 and verifiable credential module 130. The datastore applications 144, 146 in the illustrated example include contribution manager modules 148, 150 that are representative of functionality to manage indications of contributions by respective contributors to corresponding portions 142 of the digital content 140 using decentralized identifiers 132 and verifiable credentials 134.

In a digital content example configured as digital music, for instance, a variety of entities may contribute toward creation of an item of digital content. The entities 108 in the illustrated example include contributors that include a singer, guitar player, percussionist, and songwriter. For the digital content publishing system 112, examples include a venue, a sound engineer, and so forth. The decentralized identifiers 132 and verifiable credentials 134 are maintained as metadata associated with the digital content 140, e.g., associated with respective timestamps within the track at which an entity associated with individual decentralized identifiers 132 contributed to the track. The decentralized identifiers 132 and verifiable credentials 134 are thus usable to indicate an entity associated with a corresponding portion 142 and through use of the verifiable credentials 134 an assertion describing a relationship of that entity to that corresponding portion through use of the contribution manager modules 148, 150. A singer, for instance, uses the decentralized identifiers 132 to sign corresponding portion 142 of a musical track at which the singer sang.

The verifiable credentials 134 are further usable by another entity to attest to assertions made by the entity. Continuing with the above example, the singer, for instance, may associate a decentralized identifier 132 with a track of audio and indicate a particular role from a multitude of roles, e.g., is a singer, through use of the contribution manager module 148. The digital content publishing system 112 may also act as a credential issuer system to provide verifiable credentials 134 to attest that the assertion made by the artist is true through use of a respective contribution manager module 150, and in this way provide an additional degree of trust to the assertion made by the artist.

In the following discussion, examples of techniques usable to associate a decentralized identifier and verifiable credential in metadata associated with an item of digital content are described in relation to FIGS. 2-5 and 9. Examples of uses of a decentralized identifier and verifiable credentials as associated with the digital content are described in relation to FIGS. 6-8 and 10.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Figure 2:
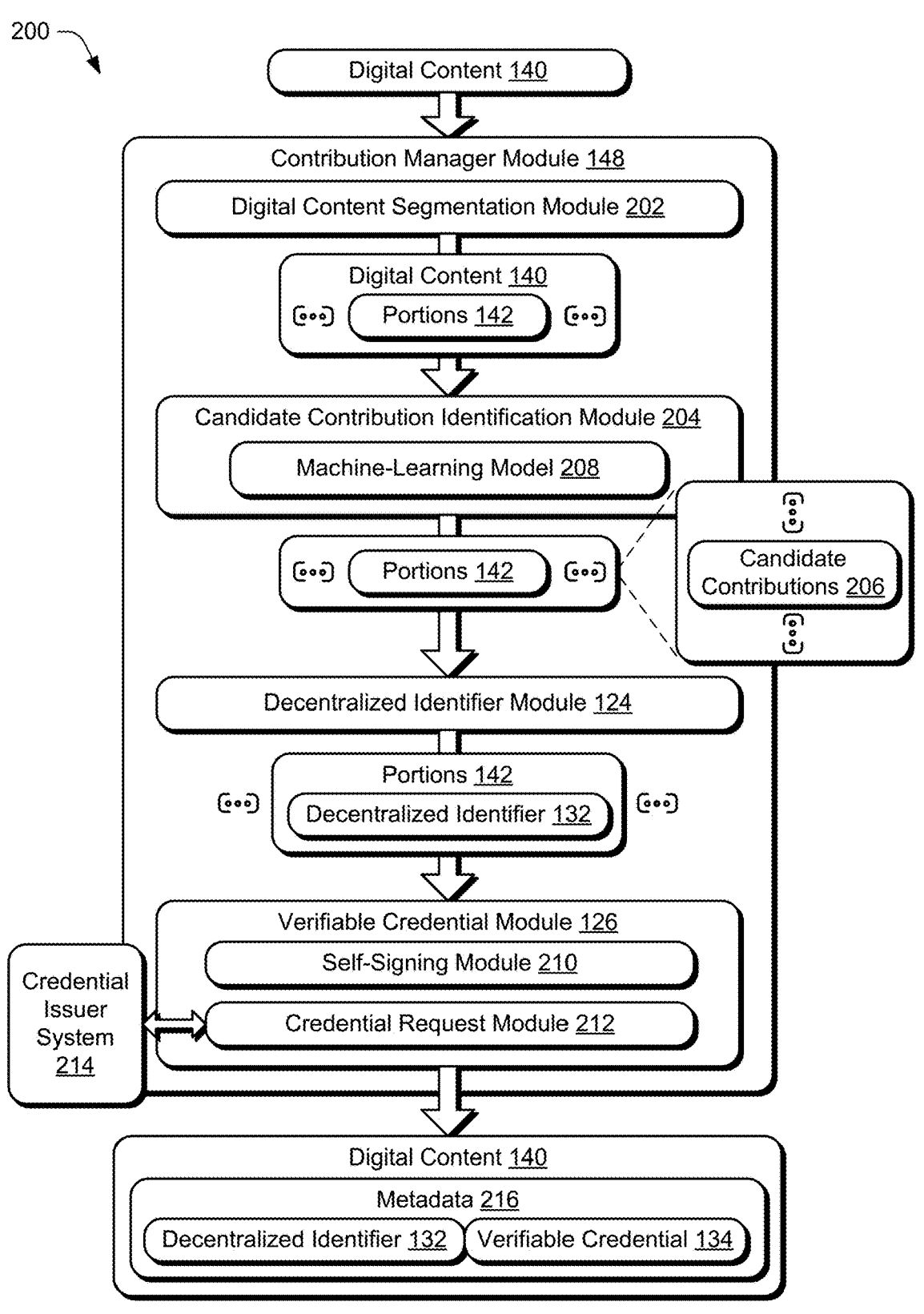
FIG. 2 is a non-limiting illustration of an example system showing operation of a datastore application in greater detail as assigning decentralized identifiers and verifiable credentials to an item of digital content as described herein according to an implementation of the present subject matter.

FIG. 2 is a non-limiting illustration of an example system 200 showing operation of a datastore application in greater detail as assigning decentralized identifiers and verifiable credentials to an item of digital content as described herein according to an implementation of the present subject matter. To begin in this example, digital content 140 is received by the contribution manager module 148 of the client device 106. Other examples are also contemplated in which the digital content 140 is received by the contribution manager module 150 of the digital content publishing system 112 or other entities.

The digital content 140, in one or more examples, is obtained from a personal datastore 136 using a respective decentralized identifier 132. In additional examples, the digital content 140 is obtained via a digital service from a service provider system, e.g., is streamed via the network 110, downloaded for local storage at the client device 106, and so on.

The digital content 140 in the illustrated example is then parsed by a digital content segmentation module 202 to form a plurality of portions 142. In this example, the portions 142 are formed such that a contribution may be identified directly with a corresponding portion of the digital content 140. Other examples are also contemplated, including a generalized indication to a contribution involving the item of digital content 140 as a whole, a portion indicated by the verifiable credential itself (i.e., the verifiable credential states the portion, to which, the contribution is made as part of the assertion), and so forth.

The portions 142 are formable in a variety of ways by the digital content segmentation module 202. In an example in which the digital content 140 includes digital audio data, the digital content segmentation module 202 employs music information retrieval, spectrogram analysis, source separation algorithms, or other functionalities to identify features within the digital content 140 and a corresponding originator (e.g., vocalist, musical instrument, or other audio source) of the portions 142. These portions are then made available for signing.

In an example in which the digital content 140 includes video data (e.g., is a digital movie), frames of the digital content 140 are parsed to identify content within the frames. The frames are then grouped into respective scenes, e.g., utilizing object identification by leveraging a machine-learning model to define common themes, and so forth.

The portions 142 of the digital content 140 are then passed in the illustrated example to a candidate contribution identification module 204. This module is configured to generate candidate contributions 206 (e.g., roles) for the portions 142 of the digital content 140. The candidate contribution identification module 204, for instance, is usable to automatically associate artist information or other rights holder information with an item of digital content. Examples of information includes identity information, names of contributes, stage/band names, verified status contribution type ownership share society (e.g., PRO), base interested party information (IPI), international standard name identifier (ISNI), publishing information, composition details, title, tags, date written intended use, split sheet executed date, splits information, and so on. The candidate contribution identification module 204, for instance, may identify the roles automatically and without user intervention through examination of the digital content 140 itself, metadata associated with the digital content 140, and so forth. Continuing with the above example, the digital content segmentation module 202 is usable to form portions 142 based on the content included in the portions 142, e.g., for particular instruments, singers, authors, composers, digital images, and so forth. The candidate contribution identification module 204 may then leverage identification of these portions to further assign candidate contributions 206 to the portions 142.

In one or more additional examples, a machine-learning model 208 is used to identify different contributions included in the digital content (e.g., different types of musical instruments) and surface (e.g., display) representations of roles in the user interface as corresponding to the contributions. The machine-learning model 208, for instance, is trainable as a classifier to identify candidate contributions 206 to the portions 142. A machine-learning model 208 refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

In an example of digital audio, for instance, the candidate contributions 206 are generated by the machine-learning model 208 when trained and retrained to identify particular instruments, audio features, and so on that are indicative of a respective contribution. In an example involving digital images, the candidate contributions 206 are trained based on features extracted from the images that are usable to identify corresponding contributions, e.g., based on style, color usage, artistic medium, and so forth.

To do so, training data is collected that involves a contribution of interest, e.g., particular musical instruments, digital images, digital videos, and so forth. The machine-learning model 208 is then trained as a classifier to extract features and learn patterns as latent representations of the contributions as part of training and retraining the model. The machine-learning model 208, once trained, is therefore usable to generate predictions (e.g., as probabilities) used to select the candidate contributions 206 from a plurality of candidate contributions based on the portions 142 of the digital content 140 itself. The machine-learning model 208 may also leverage additional data as part of this analysis.

The candidate contribution identification module 204, for instance, may also leverage additional information included in metadata associated with the digital content 140 as part of identification of the candidate contributions 206. For example, the metadata may provide insight into roles of contributors in making contributions to create the digital content 140.

In one or more examples, the candidate contribution identification module 204 detects inclusion of a decentralized identifier and/or verifiable credential as part of metadata already associated with the item of digital content 140. The detected decentralized identifier and/or verifiable credential detected by the candidate contribution identification module 204 is then usable to locate other associated decentralized identifiers or verifiable credentials, where opted into by the entity 108. Detection of a decentralized identifier of a sound engineer by the candidate contribution identification module 204, for instance, is usable to auto populate a decentralized identifier of a recording studio associated with the sound engineer, e.g., based on a social media data, global positioning system (GPS) data provided by a device associated with the sound engineer, and/or other data. The machine-learning model 208 may also be configured to process this data, alone or in combination with the digital content 140, to generate the candidate contributions 206.

The portions 142 and the candidate contributions 206 are then passed as an input to the decentralized identifier module 124. The decentralized identifier module 124 is representative of functionality to associate a decentralized identifier 132 with corresponding portions 142 of the digital content 140, e.g., a part of the digital content 140 and/or the digital content 140 as a whole. The decentralized identifier module 124 is used to verify the candidate contributions generated by the candidate contribution identification module 204 through assignment of respective decentralized identifiers 132. The verifiable credential module 126 is then employed to associate a verifiable credential 134 with the decentralized identifiers 132 to assert a contribution (which can be validated as "real") of the corresponding decentralized identifiers 132 with the portions 142.

To do so, the verifiable credential module 126 may employ a variety of different techniques to attest to different contributions (e.g., roles) associated with creating the digital content 140. In one or more examples, a self-signing module 208 is configured to generate verifiable credentials that are usable by an entity, itself, to attest to a contribution towards creation of the digital content 140. In additional examples, a credential request module 210 is configured to generate a request to invite another entity to provide verifiable credentials to attest to a contribution made by the contributor in creating the item of digital content 140. Once generated, the digital content 140 is associated with metadata 216 having decentralized identifiers 132 and verifiable credentials 134 that are usable to uniquely identify a particular entity and also attest to the contribution of the entity, e.g., for respective portions 142 of the digital content 140.

In an implementation, the self-signing module 208 is configured to generate verifiable credentials using a machine-learning model, automatically and without user intervention. The machine-learning model is trainable in a variety of ways, such as through use of digital content included in a datastore of the entity 108, may be trained at the personal datastore 136 itself (e.g., to decrease network traffic), and so forth. In this way, the machine-learning model is trained to employ increased accuracy in identification of candidate contributions by respective entities as aprt of the digital content 140.

Figure 3:
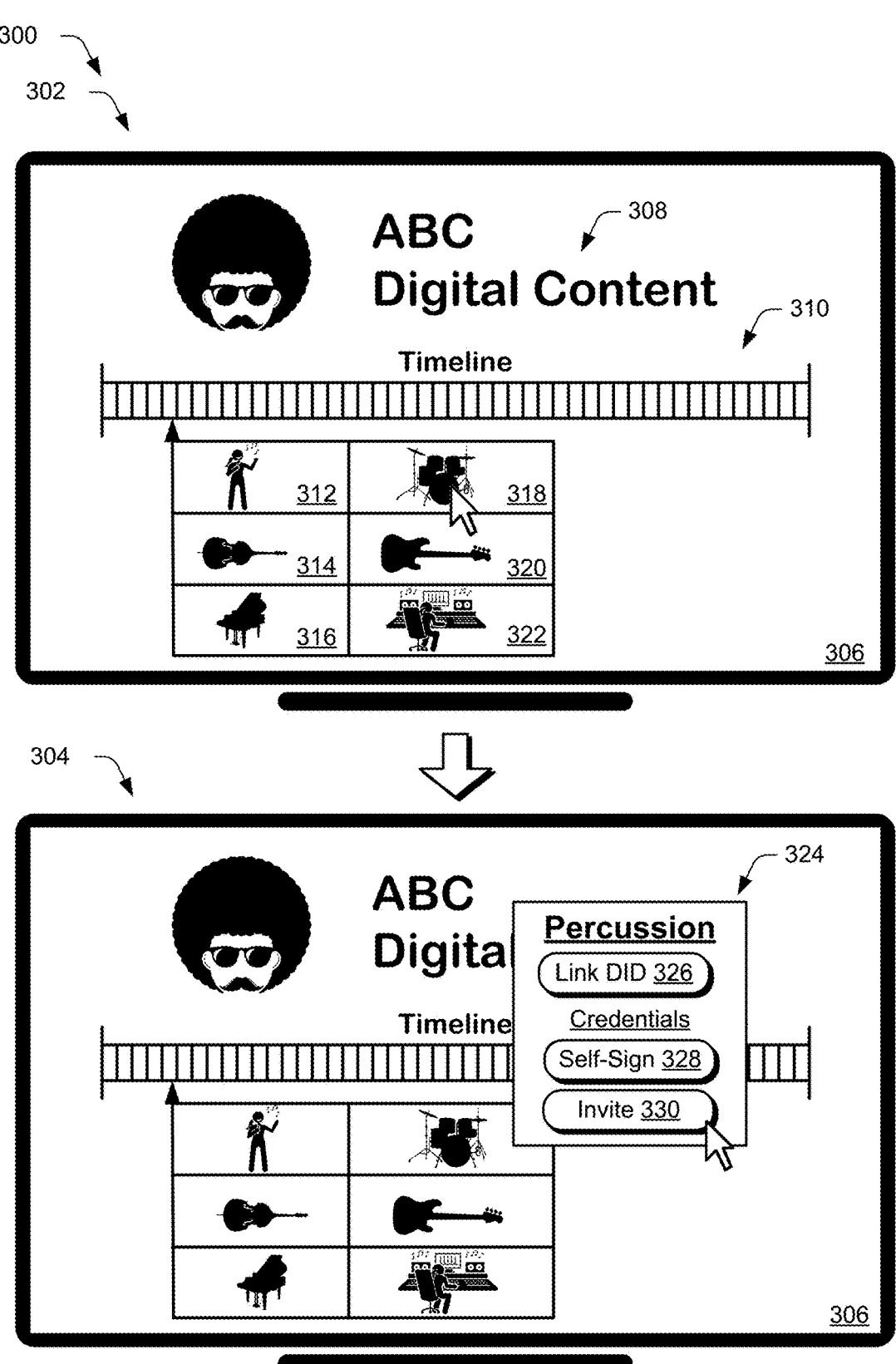
FIG. 3 is a non-limiting illustration of an example implementation showing output of user interfaces to select a representation of candidate contribution from a plurality of candidate contributions to link a decentralized identifier and associate verifiable credentials to an item of digital content as described herein according to an implementation of the present subject matter.

FIG. 3 is a non-limiting illustration of an example implementation 300 showing output of user interfaces to select a representation of a candidate contribution from a plurality of candidate contributions to link a decentralized identifier and associate verifiable credentials to an item of digital content as described herein according to an implementation of the present subject matter. This example implementation is illustrated using a first stage 302 and a second stage 304.

At the first stage 302, a user interface 306 is displayed by the datastore application 144. The user interface 306 includes a representation 308 of the item of digital content

140, e.g., "ABC Digital Content." The user interface 306 also includes representations of a plurality of portions 142 of the item of digital content 140 displayed as a timeline 310. A portion 142 of the digital content 140 is selected from the plurality of portions of the timeline 310. This selection causes display of representations of candidate contributions 206 generated to represent respective contributions towards creation of a corresponding portion of the digital content 140. Examples of the candidate contributions are displayed as roles and corresponding graphical representations, such as a singer 312, bassist 314, piano 316, percussion 318, guitar 320, and sound engineer 322. A cursor control device in this example selects a representation of the percussion 318 role using a cursor control device at the first stage 302.

In response as shown at the second stage 304, a menu 324 is output nonmodally (i.e., remains in context of the user interface 306) that includes options to specify a decentralized identifier 326 using the decentralized identifier module 124. The menu 324 also includes options made available via the verifiable credential module 126 to assign verifiable credentials as associated with the decentralized identifier 326. The options support assignment of the verifiable credentials as self-signed 328 using the self-signing module 210 and an invitation 330 to request verifiable credentials using a credential request module 212 from a credential issuer system 214 that is to attest to the selected role.

In a self-signing scenario, the artist indicates a corresponding contribution to a respective item of digital content, e.g., is a "percussionist" in this example. Verifiable credentials are then utilized to attest to this contribution, which may originate from this entity and/or involve a third-party credential issuer system 214. The artist, for instance, may self-sign the item of digital content using a corresponding verifiable credential that is issued by the artist using a verifiable credential module 126 to attest to a particular contribution (e.g., role) in the creation of the item of digital content. Therefore, in this example the entity has provided self-verification which leverages an amount of trust that is associated with the self-signing entity, itself.

This amount of trust may also be increased through use of verifiable credentials from additional entities. For example, a digital content publishing system 112 as shown in FIG. 1 may further sign the attestation made by the signer through use of a decentralized identifier and verifiable credential. This attestation is usable by the digital content publishing system 112 to further bolster the claim made by the artist, e.g., the artist composed the item of digital content as attested by the digital content publishing system 112. In some cases, multiple additional entities may sign the attestation made by the signer, which may yield additional trust by viewers or verifiers of the verifiable credential that the signer contributed as attested.

The decentralized identifier module 124, for instance, is used to input a decentralized identifier 132 to identify a respective entity. The decentralized identifier 132 is globally unique and is cryptographically verifiable. The decentralized identifier 132 is configurable through a decentralized platform 102 as described above to securely authenticate an identity of a corresponding entity, e.g., the percussionist in this example. The decentralized identifier 134 is then used to support an assertion made by the entity, e.g., the contribution as further described below.

Figure 4:
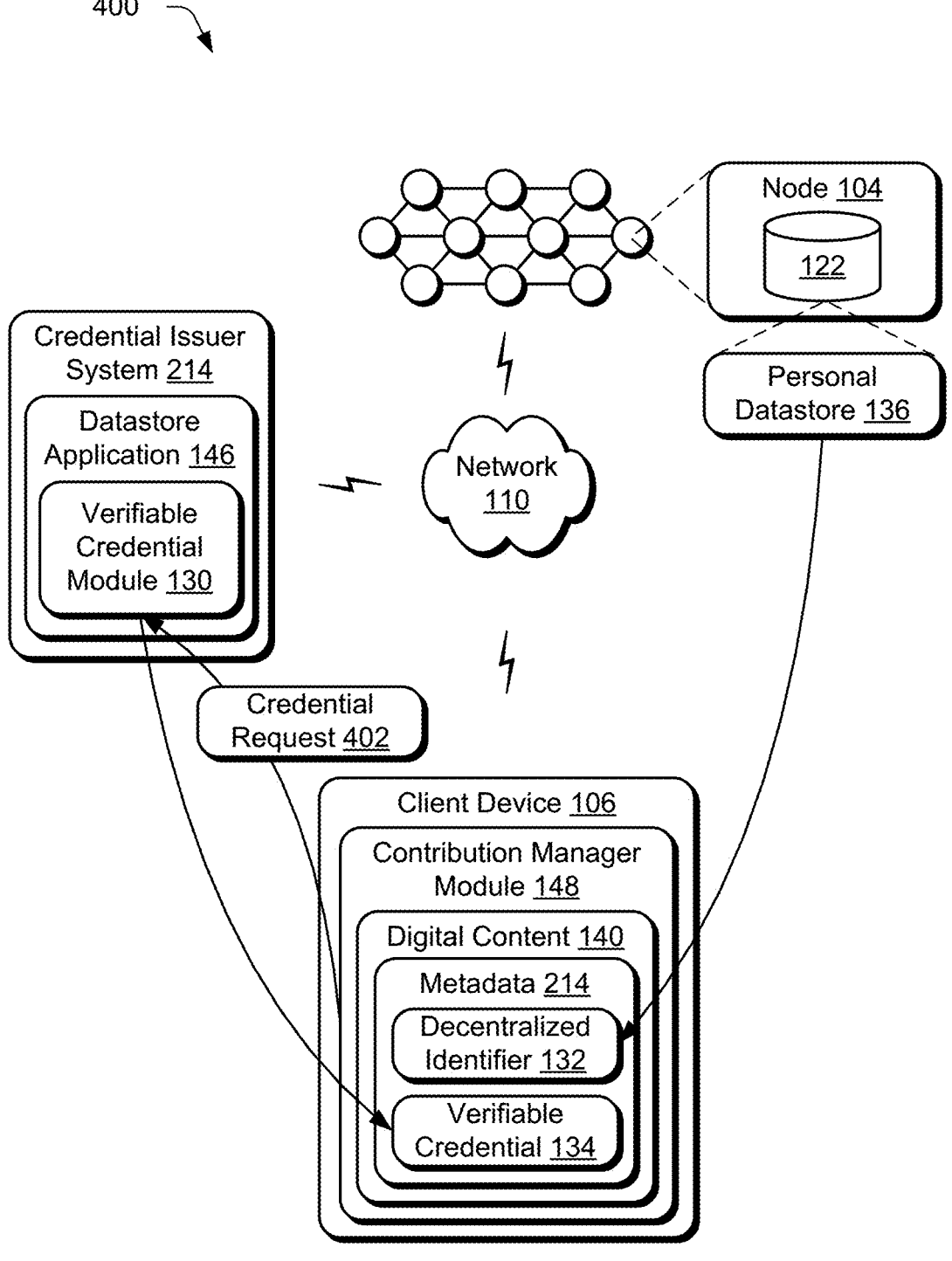
FIG. 4 is a non-limiting illustration of an example implementation to include a decentralized identifier and verifiable credential as part of metadata associated with digital content as described herein according to an implementation of the present subject matter.

FIG. 4 is a non-limiting illustration of an example implementation 400 to include one or more decentralized identifiers 132 and verifiable credentials 134 as part of metadata 216 associated with digital content 140 as described herein according to an implementation of the present subject matter. In this example, the contribution manager module 148 through use of the credential request module 212 generates a credential request 402 to a credential issuer system 214 to generate a verifiable credential 134. To do so, the credential issuer system 214 includes a decentralized identifier and associated decentralized identifier document that are written to the decentralized platform 102, e.g., through creation of a public-private key pair. The public key is shared in the decentralized identifier document and the private key is securely stored by the credential issuer system 214.

The credential issuer system 214 generates the verifiable credential 134 to attest to a set of claims made by a corresponding entity, e.g., associated with a decentralized identifier 132 as described above. The verifiable credential 134 includes the decentralized identifier of the credential issuer system 214, the decentralized identifier 132 of the subject entity (e.g., the artist), the claims being made (e.g., is a percussionist involved in creation of the digital content 140), and other data. The verifiable credential 134 is then signed with the private key of the credential issuer system 214, which is usable as a cryptographic proof to verify that the verifiable credential 134 originated with the credential issuer system 214.

In this way, the verifiable credential 134 is configurable to support standardization of qualifications, affiliations, privileges, or other claims about or made by a corresponding decentralized identifier 132. Accordingly, the decentralized identifier 132 acts as a subject of the verifiable credential 134 that is authenticated to validate that the entity associated with the decentralized identifier 132 "is who they say they are." The verifiable credential 134 supports an assertion made by the entity, e.g., is a percussionist in this example for the portion 142 of the digital content 140.

The decentralized identifiers 132 and the verifiable credentials 134 are then included as part of metadata 216 associated with the digital content 140. The metadata 216 is configured in a variety of ways. For example, the metadata 216 may be embedded as part of the digital content 140, examples of which occur in a variety of digital content formats for digital images, digital audio files, digital document formats, and so forth. The metadata 216 is also configurable to support a variety of additional information, examples of which include timestamps, location information (global positioning system information), copyright information, identification of a rights holder, and so on. Other examples of metadata 216 configurations include external metadata files, header information, and so on.

The metadata 216 and corresponding decentralized identifiers 132 and verifiable credentials 134 support a variety of functionality as associated with the digital content 140. For example, the decentralized identifier 132 is usable to resolve to a personal datastore 136 maintained at a node 104 associated with the entity 108 in the decentralized platform 102, examples of which are described as follows and shown in corresponding figures.

Figure 5:
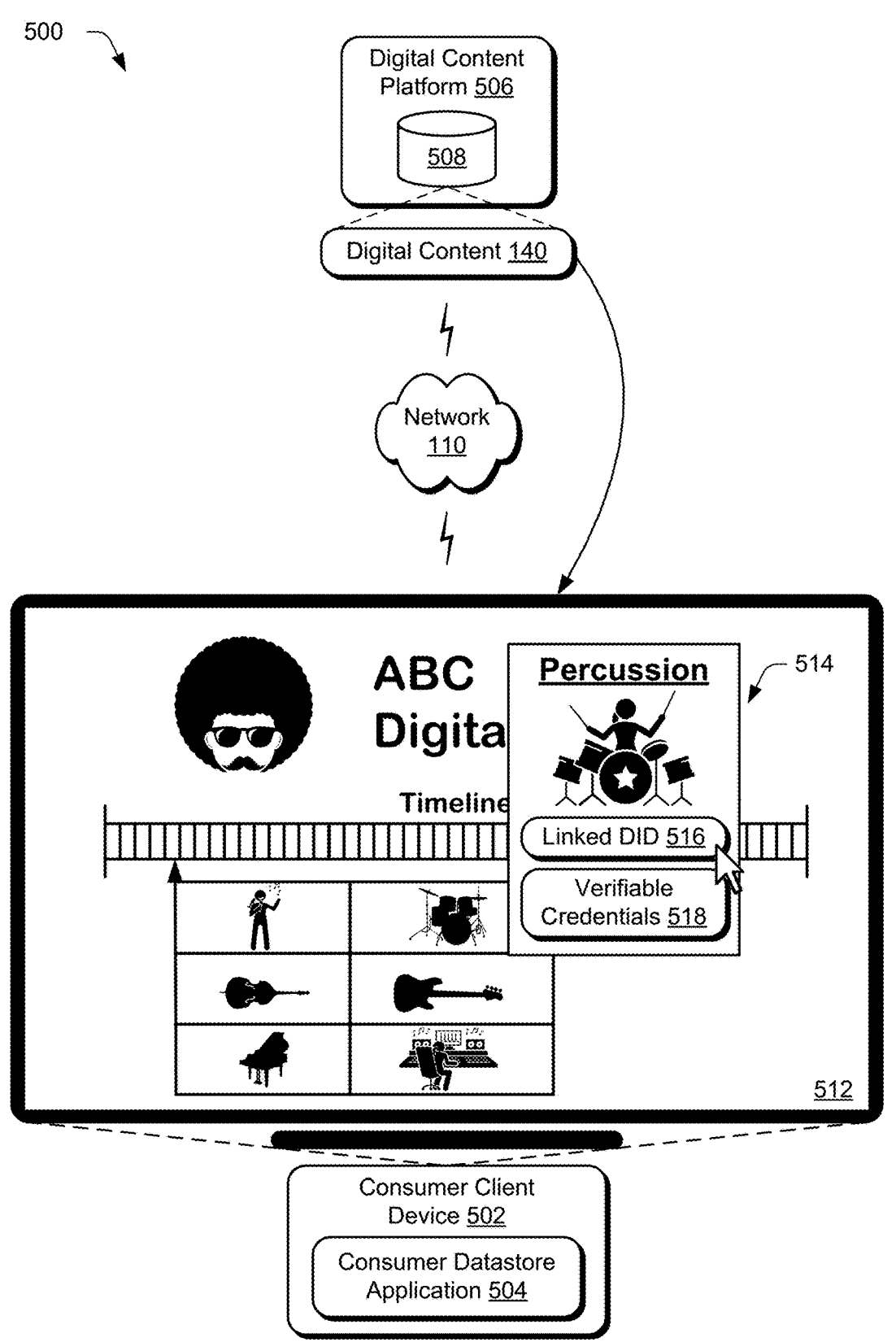
FIG. 5 is a non-limiting illustration of an example implementation showing receipt of an item of digital content by a consumer client device from a digital content platform via a network as described herein according to an implementation of the present subject matter.

FIG. 5 is a non-limiting illustration of an example implementation 500 showing receipt of an item of digital content by a consumer client device from a digital content platform via a network as described herein according to an implementation of the present subject matter. The consumer client device 502 in this example includes a consumer datastore application 504 that is usable to consume the digital content 140.

In the illustrated example, the digital content 140 is obtained from a digital content platform 506, e.g., a streaming digital service, social media service, digital storage service, and so on. The digital content 140, maintained in a storage device 508, is transmitted over the network 110 for receipt by and rendering by the consumer datastore application 504 for output in a user interface 512.

The digital content 140, as output in the user interface 512, includes representations of a title of the digital content as well as a timeline representing portions 142 of the digital content 140. Selection of a respective portion causes output of roles that have been assigned to the respective portion to indicate contributions made by respective contributors towards creation of that respective portion. In at least some examples, the roles are presented and/or are readable by the consumer client device 502 in a standardized format, which supports communication between entities which is not possible in conventional non-standardized techniques. Additionally, in some cases, the respective roles as presented in the user interface 512 may be updated in real time (accounting for network and processing times) as roles are claimed and/or verified as described herein.

Continuing with the previous example, a representation of "percussion" is selected (e.g., using a cursor control device, gesture, spoken utterance) which causes output of a menu 514. The menu 514 includes a representation 516 of a linked decentralized identifier and a representation 518 of verifiable credentials associated with the decentralized identifier.

The representation 516 of the decentralized identifier is usable to identify the respective entity and the representation 518 of the verifiable credentials is usable to identify the role, thus providing the consumer with additional insight into the digital content 140 that is not possible in conventional techniques. In an implementation, selection of the representation 518 of the verifiable credentials is usable to validate the credentials through a corresponding cryptographic proof to ensure validity of the credentials, e.g., through communication with a credential issuer system 214 that issued the credentials. The decentralized identifier and corresponding verifiable credentials are also usable to support a variety of additional functionality, such as to access a personal datastore associated with the respective entity that is accessible using the decentralized identifier as further described below.

Figure 6:
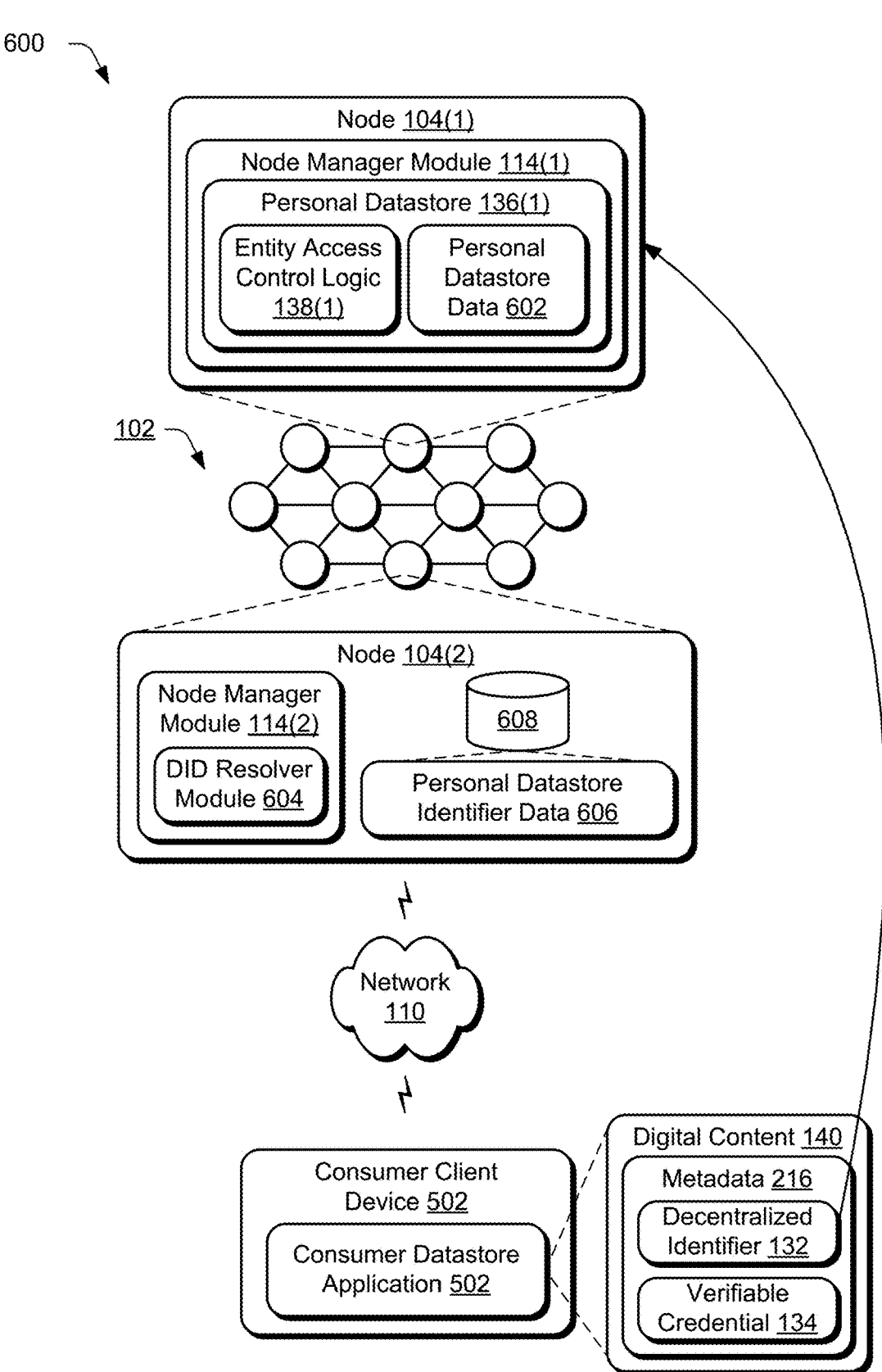
FIG. 6 is a non-limiting illustration of an example implementation showing a resolution technique to locate a personal datastore associated with a contributor towards creation of the digital content based on a respective decentralized identifier as described herein according to an implementation of the present subject matter.

FIG. 6 is a non-limiting illustration of an example implementation 600 showing a resolution technique to locate a personal datastore associated with a contributor to creation of the digital content based on a respective decentralized identifier as described herein according to an implementation of the present subject matter. The illustrated implementation includes examples of nodes in a decentralized platform 102, which includes nodes 104(1), 104(2) having respective node manager modules 114(1), 114(2). Node 104(1) is associated with a decentralized identifier 132 identifying a respective entity as a contributor to creation of the digital content 140. This node 104(1) includes entity access control logic 138(1) to control access to personal datastore data 602 maintained within the personal datastore 136(1).

The node 104(2) includes a DID resolver module 604 that leverages personal datastore identifier data 606 maintained in a storage device 608. The DID resolver module 604 is usable to assist in resolving the decentralized identifier 132 to locate the personal datastore 136(1). To do so, the consumer client device 502 parses the decentralized identifiers 132 maintained in the metadata 216 of the 140 to locate a corresponding decentralized platform 102 used to implement the decentralized identifier 132. The decentralized identifier 132 is then resolved based on techniques defined for the decentralized platform 102.

The consumer client device 502 contacts the DID resolver module 604 of the node 104(2). The DID resolver module 604 utilizes the personal datastore identifier data 606 to fetch a DID document, which is configurable as a JavaScript Object Notation (JSON) object that includes information about the decentralized identifier 132. This information includes public keys and service endpoints usable to locate the node 104(1) in the decentralized platform 102 corresponding to the decentralized identifier 132. From this information, the consumer datastore application 504 locates the personal datastore 136(1), which is usable to access personal datastore data 602 associated with the contributor as further described in the following example and shown using a corresponding figure.

Figure 7:
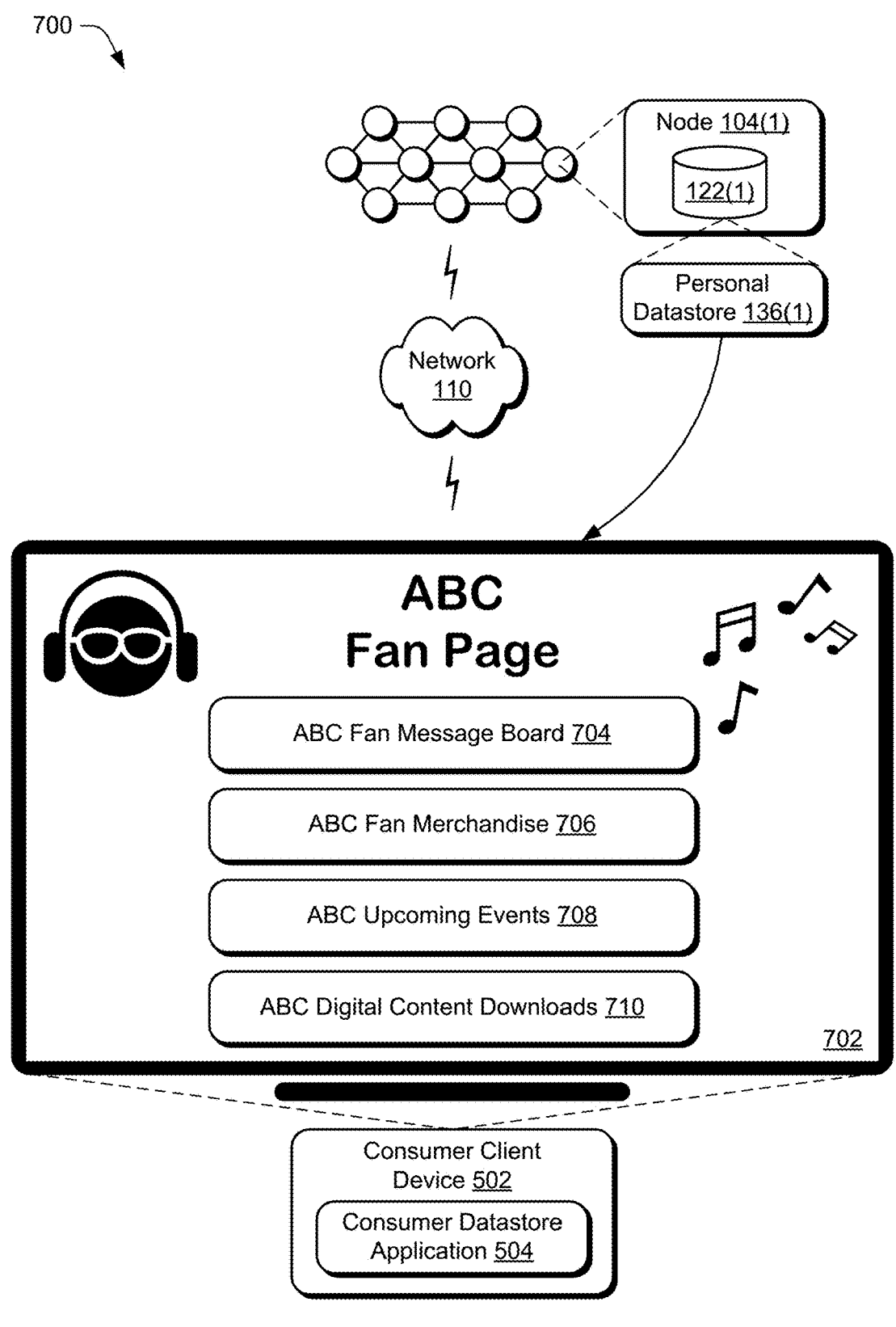
FIG. 7 is a non-limiting illustration of an example implementation showing access to a personal datastore associated with a contributor towards creation of the digital content as resolved in FIG. 6 and as described herein according to an implementation of the present subject matter.

FIG. 7 is a non-limiting illustration of an example implementation 700 showing access to a personal datastore associated with a contributor towards creation of the digital content as resolved in FIG. 6 and as described herein according to an implementation of the present subject matter. Continuing with the previous examples, the personal datastore 136(1) in this example is associated with a contributor (e.g., musician) that contributed towards creation of the digital content 140. The personal datastore 136(1) includes additional data that is usable to supplement an experience with the digital content 140 and/or provide additional information relating to the artist.

In the illustrated example, a user interface 702 is output that includes options that are usable to access different portions of the personal datastore data 602. The options include an ABC fan message board 704, ABC fan merchandise 706, ABC upcoming events 708, and ABC digital content downloads 710. In this way, the decentralized identifier 132 as associated with the digital content 140 is usable to access additional information about the entity based on the digital content 140 itself.

Figure 8:
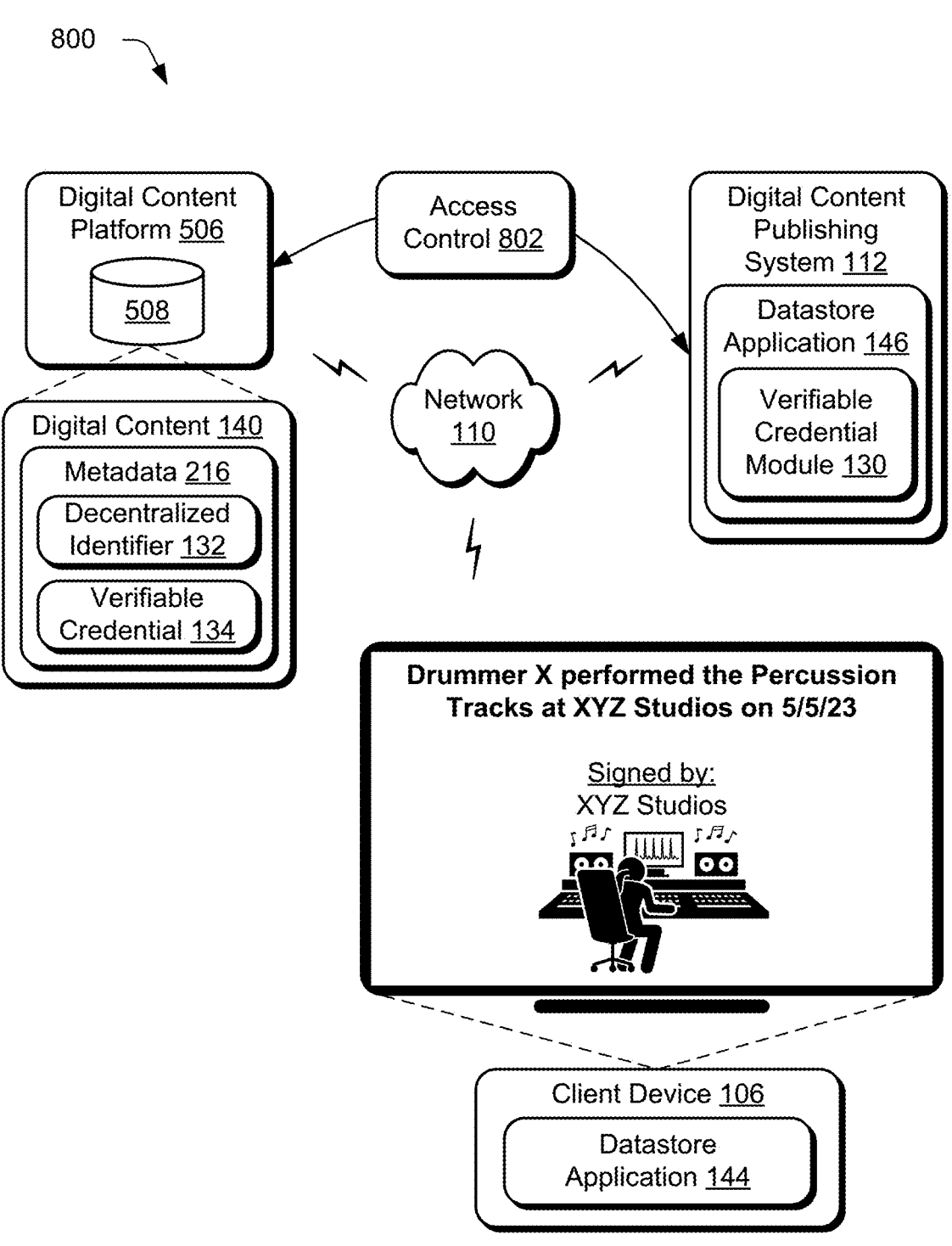
FIG. 8 is a non-limiting illustration of an example implementation leveraging verifiable credentials as part of access rights associated with digital content as described herein according to an implementation of the present subject matter.

FIG. 8 is a non-limiting illustration of an example implementation 800 leveraging verifiable credentials as part of access rights associated with digital content as described herein according to an implementation of the present subject matter. In one or more examples, the signed portions are used to enforce contractual rights and obligations through use of the decentralized identifier 132 and verifiable credential 134 maintained in the metadata 216 of the digital content 140. The decentralized identifiers 132 as described above are usable to uniquely identify a particular entity. Verifiable credentials 134, on the other hand, are used in this example to specify contractual rights of that entity to particular portions of the item of digital content, the item of digital content as a whole, and so forth.

A digital content publishing system 112, for instance, is a rights holder in this example. The digital content publishing system 112, through use of a decentralized identifier 132 and corresponding verifiable credential 134, authorizes dissemination of the digital content 140 by a digital content platform 506 as an access control 802 for a particular amount of time. The verifiable credentials 134, for instance, indicate the decentralized identifiers 132 as an additional rights holder to control dissemination of the digital content for the first three months of release of the digital content, after which the digital content 140 reverts back to the digital content publishing system 112. In this way, the verifiable credentials 134 are usable to provide access control 802 between the digital content publishing system 112 and the digital content platform 506 to control dissemination to the consumer client device 502 of FIG. 5.

Temporal aspects may also be addressed through use of verifiable credentials. Entities, for instance, may sign at different stages of content creation, e.g., from writing, to recording, to distribution, and so forth. Data describing the different stages may then be output in real time (e.g., using a standardized format) such that entities that signed in for notification of the different stages are notified with increased efficiency. A content creator at a client device 106, for instance, interacts with a user interface to indicate a respective artistic performance. This artistic performance is then verified by the digital content publishing system 112. The digital content publishing system 112 further attests to different stages, e.g., capture by a sound engineer, final mixing of the track, and so forth using corresponding decentralized identifiers and corresponding verifiable credentials.

Versioning may also be leveraged by maintaining different versions and related verifiable credentials as the digital content is created over time as associated with the verifiable credentials and corresponding decentralized identifiers. As a result, the decentralized identifiers 132 and verifiable credentials 134 are also usable to document the content creation process, which provides additional protection against appropriation or other copyright claims.

FIG. 9 is a flow diagram depicting a step-by-step procedure 900 in a non-limiting example implementation of operations and algorithms performable by a processing device for accomplishing a result of verifying contributions of contributors towards creation of digital content according to an implementation of the present subject matter. To begin in this example, an item of digital content 140 includes multiple contributors. The item of digital content 140 is accessed at a decentralized node 104 associated with a client device 106. The decentralized node 104 is one of multiple decentralized nodes in a decentralized network (block 902), e.g., implementing a decentralized platform 102.

A user interface 306 is displayed including one or more roles that are selectable to assign a decentralized identifier associated with a decentralized node as a contributor of the multiple contributors to the one or more roles (block 904). In a digital music example, the roles correspond to contributions made by respective artists, e.g., singer 312, bassist 314, piano 316, percussion 318, guitar 320. Continuing with the digital music examples, the roles may also correspond to contributions made in support of the artists, e.g., sound engineer 322.

A selection of a role of the one or more roles is received to assign the decentralized identifier as a contributor to the item of digital content (block 906). As shown at the first stage 302, a selection is made using a cursor control device to select the percussion 318 role.

A credential request 402 is sent to a credential issuer system 214 for a verifiable credential 134 to verify that the decentralized identifier 132 is a contributor to the selected role (block 908). The decentralized identifier 132, for instance, corresponds to an entity making the claim, e.g., is a percussionist for that item of digital content 140. The credential request 402 is sent to a credential issuer system 214 that is usable to verify the assertion, e.g., is associated with the digital content publishing system 112.

A determination is made as to whether the role is valid (decision block 910). The credential issuer system 214, for instance, examines data maintained locally defining a content creation process, surfaces a user interface via which an entity associated with the digital content publishing system 112 may verify the claim, and so forth. If not ("no" from decision block 910), the procedure 900 returns to block 908. If so ("yes" from decision block 910), the verifiable credential 134 is received from the credential issuer system 214 (block 912) at the client device 106.

The verifiable credential 134 and the decentralized identifier 132 are stored as a contributor to the role as part of metadata 214 associated with the item of digital content 140 at the decentralized node 104 (block 914), e.g., at a personal datastore 136. In response a request received to access the contributor of the digital content 140 item, the metadata 214 is transmitted identifying the decentralized identifier 132 as the contributor to the role and the verifiable credential 134 (block 916) as attesting to the role, e.g., at a consumer client device 502.

FIG. 10 is a flow diagram depicting a step-by-step procedure 1000 in a non-limiting example implementation of operations and algorithms performable by a processing device for accomplishing a result of accessing verifiable credentials to identify contributors in creating an item of digital content according to an implementation of the present subject matter. To begin in this example, digital content is obtained (block 1002), e.g., from a digital service from a service provider system via the network 110, locally at the consumer client device 502, and so forth.

A plurality of portions is located from the digital content 140 (block 1004) by the consumer client device 502. The portions, for instance, may correspond to different music tracks, chapters of a digital content, scenes in a digital video, levels in a digital video game, and so forth.

A decentralized identifier 132 and verifiable credentials 134 are identified as associated with a respective portion of the plurality of portions. The decentralized identifier 132 is resolvable to a respective node 104(1) from a decentralized network of nodes that are individually configured to store, receive, and transmit data (block 1006), e.g., as part of the decentralized platform 102.

A determination is made by the node manager module 114(1) using entity access control logic 138(1) as to whether the verifiable credentials are valid (decision block 1008). The node manager module 114(1), for instance, examines the cryptographic proof of the verifiable credentials 134 to determine validity. If the verifiable credential 134 is not valid ("no" from decision block 1008), an invalid notification is output (block 1010).

If the verifiable credential 134 is valid ("yes" from decision block 1008), representations of the decentralized identifiers 132 are displayed as shown in FIG. 5 that are indicative of a respective entity and a corresponding verifiable credential validating a relation of the respective entity with the respective portion (block 1012). In this way, an entity associated with the consumer client device 502 is provided insight that is not possible in conventional techniques.

Figure 11:
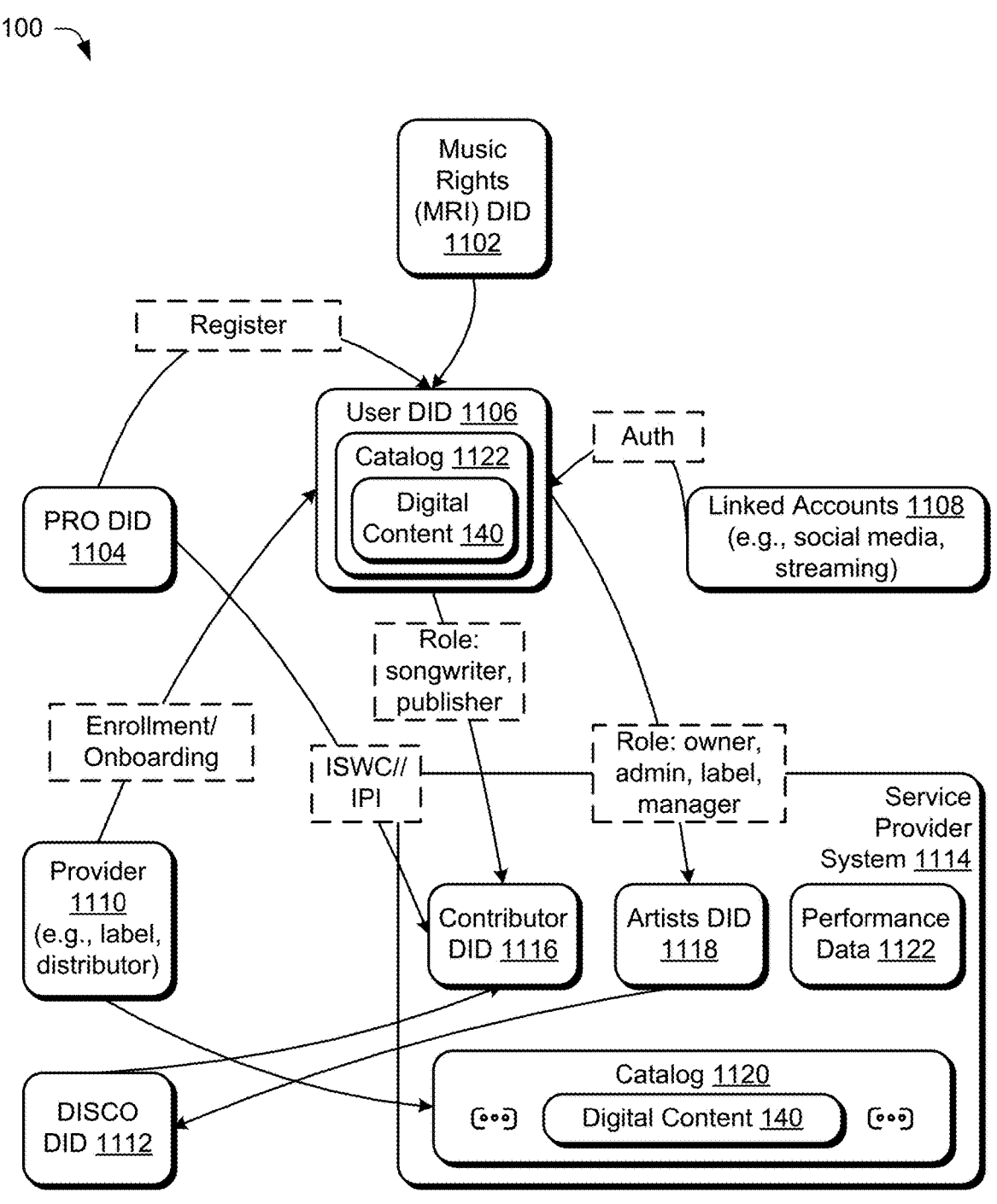
FIG. 11 is a non-limiting illustration of an example implementation showing a system diagram as described herein according to an implementation of the present subject matter.

FIG. 11 is a non-limiting illustration of an example implementation 1100 showing a system diagram as described herein according to an implementation of the present subject matter. The illustrated system includes a music rights (MRI) DID 1102, a performing rights organization DID illustrated as "PRO" DID 1104, a user DID 1106, linked accounts 1108, a provider 1110, a content distributor DID (e.g., a DISCO DID 1112), and a service provider system 1114. The service provider system 1114 includes a contributor DID 1116, an artists DID 1118, and a catalog 1120 of digital content 140. The user DID 1106 is also configurable to include a catalog 1122 and digital content 140.

The music rights DID 1102 is associated with a variety of verifiable credentials and information. Example of which include a social security number (SSN), individual taxpayer identification number (ITIN), bank account information, contact information, international standard recording code (ISRC), international standard musical word code (ISWC), interested party information (IPI) which is unique international identification number assigned to songwriters and music publishers, and includes writer/publishing splits.

The PRO DID 1104 is also associated with a variety of verifiable credentials and information. Examples of which include a social security number (SSN), individual taxpayer identification number (ITIN), bank account information, contact information, international standard recording code (ISRC), international standard musical word code (ISWC), interested party information (IPI) and includes writer-publishing splits.

The user DID 1106 is also associated with a variety of verifiable credentials and information. Examples of which include a social security number (SSN), individual taxpayer identification number (ITIN), bank account information, date of birth, full name, address, email, ISNI, interested party information (IPI), SSN, and ITIN.

The linked accounts 1108 include social media and streaming digital services. The social media services include a variety of verifiable credentials and associated information, examples of which include followers and engagement data. For streaming digital services, examples include fan data and marketing data.

The provider 1110 is associated with a variety of verifiable credentials and information. Examples of which include a social security number (SSN), individual taxpayer identification number (ITIN), and bank account information. Examples of work metadata include international standard recording code (ISRC), interested party information (IPI), and includes writer/publishing splits.

The DISCO DID 1112 is associated with a variety of verifiable credentials and information. Examples of which include a social security number (SSN), individual taxpayer identification number (ITIN), and bank account information. Examples of work metadata include international standard recording code (ISRC), interested party information (IPI), and includes writer/publishing splits.

The service provider system 1114 includes a contributor DID 1116, an artists DID 1118, and a catalog 1120 of digital content 140. The contributor DID 1116 includes an IRSW, interested party information (IPI), a contributor ID, and contributor metadata. The artists DID 1118 includes an international standard name identifier (ISNI) that uniquely identifies individuals and organizations involved in creative activities, IPI, artist ID, and bio. The catalogs 1120, 1122 include the digital content 140. Performance data 1122 includes audience data and track performance data that may be output in a standardized format that are compatible with each other to enable data sharing between respective systems. The following table includes additional examples of metadata associate with a particular decentralized identifiers.

| DID | DWN |
|---|---|
| User | Name |
| | DOB |
| | SSN |
| | Bank Info |
| Music Reports (MRI) | Writers |
| | IPI |
| | Bank Info |
| | Publishers |
| | Tracks |
| | Works |

-continued

| DID | DWN |
|---|---|
| PRO | IPI |
| | Works |
| | Splits Information |
| | Publisher |
| | Royalty Payments |
| Provider (Label/Distributor) | DDEX feeds |
| | ISNI |
| | Image |
| | Bio |
| DISCO | Unreleased Tracks |
| | Sync Pitches |
| | Industry Contacts |
| | Playlist data |
| Contributor | Splits |
| | IPI |
| | Registration Status |
| Artist Account | ISNI |
| | Image |
| | Bio |
| | Socials |

Figure 12:
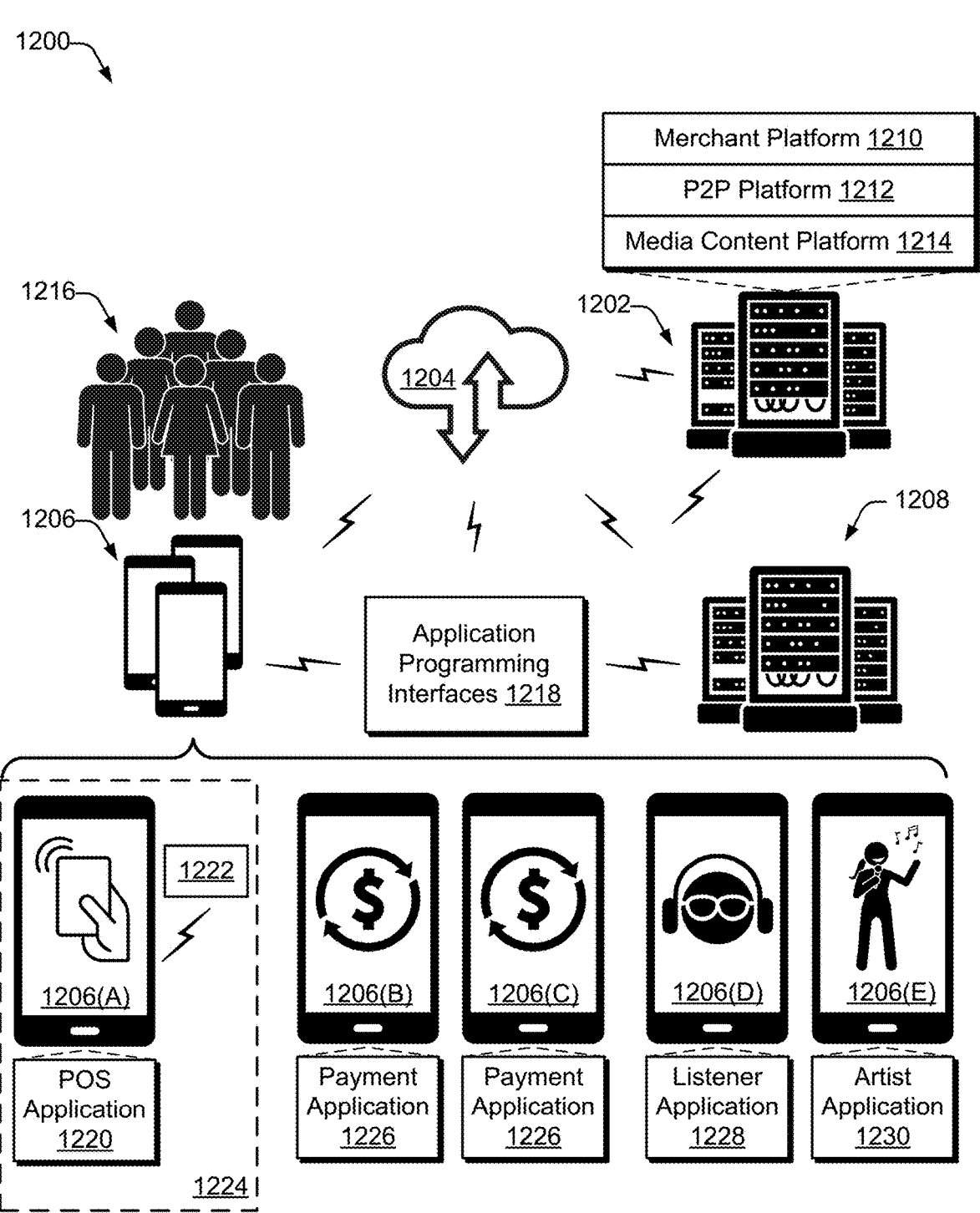
FIG. 12 is a non-limiting example illustrating an environment in which recommendation techniques described herein are performed in accordance with one or more implementations.

FIG. 12 illustrates an example environment 1200 in which recommendation techniques described herein are performed in accordance with one or more implementations. The environment 1200 includes server(s) 1202 that can communicate over a network 1204 with end user devices 1206 and/or server(s) 1208 associated with third-party service provider(s). In various examples, the end user devices 1206 may comprise one or more seller devices 1206(A), one or more user devices 1206(B) and/or 1206(C) in a peer network, one or more content consumption devices 1206(D), one or more artist devices 1206(E), combinations of these examples, or other categories of user devices. The server(s) 1202 can be associated with one or more service providers that can provide one or more services for the benefit of users 1216, as described below. For example, the server(s) 1202 may enable services of service providers such as in association with a seller platform 1210 (which may further include a buyer platform), a peer-to-peer (P2P) payment platform 1212, a media content platform 1214, a combination of these platforms, or other platforms associated with other service providers. While services and features are referenced throughout in connection with a particular one of the seller platform 1210, the P2P payment platform 1212, or the media content platform 1214, it should be understood that any of these platforms may perform the functionality described in relation to any of the other platforms. Actions attributed to the service provider(s) can be performed by the server(s) 1202, e.g., by the digital content publishing system 112, nodes 104, and so forth.

In some examples, individual ones of the end user devices 1206 can be operable by users 1216. The users 1216 (individually referred to herein as "user 1216") can be referred to as customers, buyers, merchants, sellers, borrowers, employees, employers, payors, payees, couriers, artists, musicians, listeners, fans, supervisors, hosts, audience members, and so on. The users 1216 can interact with the end user devices 1206 via user interfaces presented via the end user devices 1206. In at least one example, a user interface can be presented via a web browser, or the like. Alternatively or additionally, a user interface can be presented via an application, such as a mobile application or desktop application, which can be provided by the seller platform 1210, the P2P payment platform 1212, and/or the media content platform 1214, or which can be an otherwise dedicated application. In some examples, individual end user devices 1206 can have an instance or versioned instance of an application, which can be downloaded from an application store, for example, which can present the user interface(s) described herein.

In at least one example, the users 1216 can include merchants that can operate the seller device(s) 1206(A) that are configured for use by merchants. For the purpose of this discussion, a "merchant" can be any entity that offers items (e.g., goods or services) for purchase or other means of acquisition (e.g., rent, borrow, barter, etc.). The merchants can offer items for purchase or other means of acquisition via brick-and-mortar stores, mobile stores (e.g., pop-up shops, food trucks, etc.), online stores, event venues, combinations of the foregoing, and so forth. In some examples, at least some of the merchants can be associated with the same entity but can have different merchant locations and/or can have franchise/franchisee relationships.

In additional or alternative examples, the merchants can be different merchants. For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

The seller device 1206(A) can have an instance of a point of sale ("POS") application 1220 stored thereon. The POS application 1220 can configure the seller device 1206(A) as a POS terminal, which enables the merchant to interact with one or more customers. In at least one example, interactions between the customers and the merchants that involve the exchange of funds (from the customers) for items or services (from the merchants) can be referred to as "transactions." In at least one example, the POS application 1220 can determine transaction data associated with the POS transactions. Transaction data can include payment information, which can be obtained from a reader device 1222 associated with the seller device 1206(A), user authentication data, purchase amount information, point-of-purchase information (e.g., item(s) purchased, date of purchase, time of purchase, subscription type, etc.), etc. The POS application 1220 can send transaction data to the server(s) 1202 such that the server(s) 1202 can track transactions of the customers, merchants, and/or the users 1216 over time. Furthermore, the POS application 1220 can present a UI to enable the merchant to interact with the POS application 1220 and/or the seller platform 1210 via the POS application 1220.

In at least one example, the seller device 1206(A) can be a special-purpose computing device configured as a POS terminal (via the execution of the POS application 1220). In at least one example, the POS terminal may be connected to a reader device 1222, which is capable of accepting a variety of payment instruments, such as credit cards, debit cards, gift cards, short-range communication based payment instruments, and the like, as described below. In at least one example, the reader device 1222 can plug in to a port in the seller device 1206(A), such as a microphone port, a headphone port, an audio-jack, a data port, or other suitable port. In additional or alternative examples, the reader device 1222 can be coupled to the seller device 1206(A) via another wired or wireless connection, such as via Bluetooth®, BLE, and so on. In some examples, the reader device 1222 can be a software solution executing on the POS terminal, e.g., a mobile phone. In some examples, the reader device 1222 can read information from alternative payment instruments including, but not limited to, wristbands and the like.

In some examples, the reader device 1222 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards, hardware wallets, fobs, or devices configured for tapping). The POS terminal may provide a rich user interface, communicate with the reader device 1222, and communicate with the seller platform 1210, which can provide, among other services, a payment processing service. The server(s) 1202 associated with the seller platform 1210 can communicate with server(s) 1208, as described below. In this manner, the POS terminal and reader device 1222 may collectively process transaction(s) between the merchants and customers. In some examples, multiple POS terminal(s) may be connected to a number of other devices, such as "secondary" terminals, e.g., back-of-the-house systems, printers, line-buster devices, reader devices, speakers, and the like, to allow for information from the secondary terminal to be shared between the primary POS terminal(s) and secondary terminal(s), for example via short-range communication technology. This kind of arrangement may continue operation in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1222 of the POS system 1224 are shown as separate devices, in additional or alternative examples, the POS terminal and the reader device 1222 can be part of a single device. In some examples, the reader device 1222 can have a display integrated therein for presenting information to customers of a merchant. In additional or alternative examples, the POS terminal can have a display integrated therein for presenting information to the customers of the merchant. POS systems, such as the POS system 1224, may be mobile, such that POS terminals and reader devices may process transactions in disparate locations across the world. POS systems can be used for processing card-present transactions and card-not-present (CNP) transactions.

A card-present transaction is a transaction where both a customer and the customer's payment instrument are physically present at the time of the transaction. Card-present transactions may be contact or contactless transactions processed by swipes (e.g., by sliding a magnetic strip through a reader device), dips (e.g., by inserting an embedded microchip into a reader device), taps (e.g., by wirelessly, through Bluetooth, NFC or other short range technology hover or tap a payment instrument into a reader device), or any other interaction between a physical payment instrument (e.g., a card), or otherwise present payment instrument, and a reader device 1222, whereby the reader device 1222 is able to obtain payment data from the payment instrument.

A CNP transaction is a transaction where a card, or other payment instrument, is not physically present at the POS such that payment data is manually keyed in (e.g., by a merchant, customer, etc.), or payment data is required to be recalled from a card-on-file data store, to complete the transaction.

The POS system 1224, the server(s) 1202, and/or the server(s) 1208 may exchange payment information and transaction data to determine whether transactions are authorized. For example, the POS system 1224 may provide encrypted payment data, user authentication data, purchase amount information, point-of-purchase information, etc. (collectively, transaction data) to server(s) 1202 over the network(s) 1204. The server(s) 1202 may send the transaction data to the server(s) 1208.

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. In at least one example, the service provider can serve as an acquirer and connect directly with the card payment network.

The card payment network (e.g., the server(s) 1208 associated therewith) can forward the fund transfer request to an issuing bank (e.g., "issuer"). The issuer is a bank or financial institution that offers a financial account (e.g., credit or debit card account) to a user. The issuer (e.g., the server(s) 1208 associated therewith) can make a determination as to whether the customer has the capacity to absorb the relevant charge associated with the payment transaction. In at least one example, the seller platform 1210 can serve as an issuer and/or can partner with an issuer. The transaction is either approved or rejected by the issuer and/or the card payment network (e.g., the server(s) 1208 associated therewith), and a payment authorization message is communicated from the issuer to the POS device via a path opposite of that described above, or via an alternate path.

The server(s) 1208 may send an authorization notification over the network(s) 1204 to the server(s) 1202, which may send the authorization notification to the POS system 1224 over the network(s) 1204 to indicate whether the transaction is authorized. The server(s) 1202 may also transmit additional information such as transaction identifiers to the POS system 1224. In one example, the server(s) 1202 may include a merchant application and/or other functional components for communicating with the POS system 1224 and/or the server(s) 1208 to authorize or decline transactions (e.g., the API 1218). In examples, the seller platform 1210 can enable the merchants to receive cash payments, payment card payments, and/or electronic payments from customers for POS transactions and the service provider can process transactions on behalf of the merchants.

Based on the authentication notification that is received by the POS system 1224 from server(s) 1202, the merchant may indicate to the customer whether the transaction has been approved. In some examples, approval may be indicated at the POS system 1224, for example, at a display of the POS system 1224. In some cases, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

The seller platform 1210 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, media content (e.g., music, videos, etc.) management and/or subscription services, and so on. In some examples, the user devices 1206 can access all of the services. In some cases, the user devices 1206 can have gradated access to the services, which can be based on risk tolerance, IDV outputs, subscriptions, and so on. In at least one example, access to such services can be availed to the merchants via the POS application 1220. In additional or alternative examples, each service can be associated with its own access point (e.g., application, web browser, etc.).

As the seller platform 1210 processes transactions on behalf of the merchants, the seller platform 1210 can maintain accounts or balances for the merchants in one or more ledgers. For example, the seller platform 1210 can analyze transaction data received for a transaction to determine an amount of funds owed to a merchant for the transaction and deposit funds into an account of the merchant. The account can have a stored balance, which can be managed by the seller platform 1210. The account can be different from a conventional bank account at least because the stored balance is managed by a ledger of the seller platform 1210 and the associated funds are accessible via various withdrawal channels including, but not limited to, scheduled deposit, same-day deposit, instant deposit, and a linked payment instrument.

A scheduled deposit can occur when the seller platform 1210 transfers funds associated with a stored balance of the merchant to a bank account of the merchant that is held at a bank or other financial institution (e.g., associated with the server(s) 1208). Scheduled deposits can occur at a prearranged time after a POS transaction is funded, which can be a business day after the POS transaction occurred, or sooner or later. In some examples, the merchant can access funds prior to a scheduled deposit (e.g., same-day deposits and/or real-time deposits). Further, in at least one example, the merchant can have a payment instrument that is linked to the stored balance that enables the merchant to access the funds without first transferring the funds from the account managed by the seller platform 1210 to the bank account of the merchant.

In at least one example, the seller platform 1210 may provide inventory management services. That is, the seller platform 1210 may provide inventory tracking and reporting. Inventory management services may enable the merchant to access and manage a database storing data associated with a quantity of each item that the merchant has available (i.e., an inventory). Furthermore, in at least one example, the seller platform 1210 can provide catalog management services to enable the merchant to maintain a catalog, which can be a database storing data associated with items that the merchant has available for acquisition (i.e., catalog management services). The seller platform 1210 can offer recommendations related to pricing of the items, placement of items on the catalog, and multi-party fulfillment of the inventory, to name a few examples.

In at least one example, the seller platform 1210 can provide business banking services, which allow the merchant to track deposits (from payment processing and/or other sources of funds) into an account of the merchant, payroll payments from the account (e.g., payments to employees of the merchant), payments to other merchants (e.g., business-to-business) directly from the account or from a linked debit card, withdrawals made via scheduled deposit and/or real-time deposit, configure allocations among multiple balances or accounts (e.g., spending, saving, taxes, etc.), etc. Furthermore, the business banking services can enable the merchant to obtain a customized payment instrument (e.g., credit card), check how much money the merchant is earning (e.g., via presentation of available earned balance), understand where the money of the merchant is going (e.g., via deposit reports (which can include a breakdown of fees), spend reports, etc.), access/use earned money (e.g., via scheduled deposit, real-time deposit, linked payment instrument, etc.), have improved control of the money of the merchant (e.g., via management of deposit schedule, deposit speed, linked instruments, etc.), etc. Moreover, the business banking services can enable the merchants to visualize their cash flow to track their financial health, set aside money for upcoming obligations (e.g., savings), organize money around goals, etc.

In at least one example, the seller platform 1210 can provide financing services and products, such as via business loans, consumer loans, fixed term loans, flexible term loans, and the like. In at least one example, the service provider can utilize one or more risk signals to determine whether to extend financing offers and/or terms associated with such financing offers. Such risk signals can be particular to an individual platform or service, as described herein, or can be based on aggregated data associated with multiple of the platforms or services. In at least one example, the seller platform 1210 can provide financing services for offering and/or lending a loan to a borrower that is to be used for, in some instances, financing the borrower's short-term operational needs (e.g., a capital loan). Additionally or alternatively, the seller platform 1210 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant. The seller platform 1210 can generate the loan based at least in part on determining that the borrower purchased or intends to purchase the item from the merchant. Advances, loans, or other funds provided to a merchant or other user can be repaid via a variety of mechanisms. In some examples, loans can be repaid in installments (e.g., multiple payments over time), at a particular date, from a portion of incoming funds (e.g., payments processed for the merchant, tax refunds, direct deposits, etc.), or the like.

The seller platform 1210 can provide web-development services, which enable users 1216 who are unfamiliar with HTML, XML, Javascript, CSS, or other web design tools to create and maintain functional websites. Further, in addition to websites, the web-development services can create and maintain other online omni-channel presences, such as social media posts for example. In some examples, the resulting web page(s) and/or other content items can be used for offering item(s) for sale via an online/e-commerce platform. In at least one example, the seller platform 1210 can recommend and/or generate content items to supplement omni-channel presences of the merchants.

Furthermore, the seller platform 1210 can provide payroll services to enable employers to pay employees for work performed on behalf of employers. In at least one example, the seller platform 1210 can receive data that includes time worked by an employee (e.g., through imported timecards and/or POS interactions), sales made by the employee, gratuities received by the employee, and so forth. Based on such data, the seller platform 1210 can make payroll payments to employee(s) on behalf of an employer via the payroll service. For instance, the seller platform 1210 can facilitate the transfer of a total amount to be paid out for the payroll of an employee from the bank of the employer to the bank of the seller platform 1210 to be used to make payroll payments. In at least one example, when the funds have been received at the bank of the seller platform 1210, the seller platform 1210 can pay the employee, such as by check or direct deposit.

Moreover, in at least one example, the seller platform 1210 can provide employee management services for managing schedules of employees. Further, the seller platform 1210 can provide appointment services for enabling users 1216 to set schedules for scheduling appointments and/or users 1216 to schedule appointments.

In some examples, the seller platform 1210 can provide restaurant management services to enable users 1216 to make and/or manage reservations, to monitor front-of-house and/or back-of-house operations, and so on. In such examples, the seller device(s) 1206(A) and/or server(s) 1202 can be configured to communicate with one or more other computing devices, which can be located in the front-of-house (e.g., POS device(s)) and/or back-of-house (e.g., kitchen display system(s) (KDS)). In at least one example, the seller platform 1210 can provide order management services and/or fulfillment services to enable restaurants (or other merchant types) to manage open tickets, split tickets, and so on and/or manage fulfillment services.

In some examples, the seller platform 1210 can provide omni-channel fulfillment services. A fulfillment service includes item ordering and delivery services, such as via a courier. In some examples, the courier can be an unmanned aerial vehicle (e.g., a drone), an autonomous vehicle, or any other type of vehicle capable of receiving instructions for traveling between locations. For instance, if a customer places an order with a merchant and the merchant cannot fulfill the order because one or more items are out of stock or otherwise unavailable, the seller platform 1210 can leverage other merchants and/or sales channels that are part of the seller platform 1210 to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the seller platform 1210 can enable conversational commerce via conversational commerce services, which can use one or more machine learning mechanisms to analyze messages exchanged between two or more users 1216, voice inputs into a virtual assistant or the like, to determine intents of user(s) 1216. In some examples, the seller platform 1210 can utilize determined intents to automate customer service, offer promotions, provide recommendations, or otherwise interact with customers in real-time. In at least one example, the seller platform 1210 can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1216 may be new to the seller platform 1210 such that the user 1216 that has not registered (e.g., subscribed to receive access to one or more services offered by the seller platform 1210) with the seller platform 1210. The seller platform 1210 can offer onboarding services for registering a potential user 1216 with the seller platform 1210. In some examples, onboarding can involve presenting various questions, prompts, and the like to a potential user 1216 to obtain information that can be used to generate a profile for the potential user 1216. In at least one example, the seller platform 1210 can provide limited or short-term access to its services prior to, or during, onboarding (e.g., a user of a peer-to-peer payment service can transfer and/or receive funds prior to being fully onboarded, a merchant can process payments prior to being fully onboarded, a user of a music streaming service can listen to music having advertisement breaks prior to being fully onboarded, etc.). In response to full or partial completion of onboarding, any limited or short-term access to services of the seller platform 1210 can be transitioned to more permissive (e.g., less limited) or longer-term access to such services.

The seller platform 1210 can be associated with IDV services, which can be used by the seller platform 1210 for compliance purposes and/or can be offered as a service, for instance to third-party service providers (e.g., associated with the server(s) 1208). That is, the seller platform 1210 can offer IDV services to verify the identity of users 1216 seeking to use or using their services. Identity verification may involve requesting a customer (or potential customer) to provide information that is used by compliance departments to prove that the information is associated with an identity of a real person or entity (e.g., an artist). In at least one example, the seller platform 1210 can perform services for determining whether identifying information provided by a user 1216 accurately identifies the customer (or potential customer).

Techniques described herein can be configured to operate in both real-time/online and offline modes. "Online" modes refer to modes when devices are capable of communicating with the seller platform 1210 while offline mode refers to modes when devices are unable to communicate with the server(s) 1208 due to network connectivity issue, for example. In such examples, devices may operate in "offline" mode where at least some payment data is stored (e.g., on the seller device(s) 1206(A)) and/or the server(s) 1202 until connectivity is restored and the payment data can be transmitted to the server(s) 1202 and/or the server(s) 1208 for processing.

In at least one example, the seller platform 1210 can be associated with a hub, such as an order hub, an inventory hub, a fulfillment hub and so on, which can enable integration with one or more additional service providers (e.g., associated with the additional server(s) 1208). In some examples, such additional service providers can offer additional or alternative services and the service provider can provide an interface or other computer-readable instructions to integrate functionality of the service provider into the one or more additional service providers.

Turning now to the P2P functionality provided by the environment 1200, the P2P platform 1212 can provide a peer-to-peer payment service that enables peer-to-peer payments between two or more of the users 1216. Two or more of the users 1216 may be considered "peers" in a peer-topeer interaction, such as a payment. In at least one example, the P2P platform 1212 can communicate with instances of a payment application 1226 (or other access point) installed on end user devices 1206 configured for operation by the users 1216. In an example, an instance of the payment application 1226 executing on a first user device 1206(B) operated by a payor (e.g., one of the users 1216) can send a request to the P2P platform 1212 to transfer an asset (e.g., fiat currency, non-fiat currency, digital assets such as non-fungible tokens (NFTs), cryptocurrency, securities, gift cards, and/or related assets) from the payor to a payee (e.g., a different one of the users 1216) via a peer-to-peer payment. In some examples, assets associated with an account of the payor are transferred to an account of the payee. In some examples, assets can be held at least temporarily in an account of the P2P platform 1212 prior to transferring the assets to the account of the payee.

Figure 13:
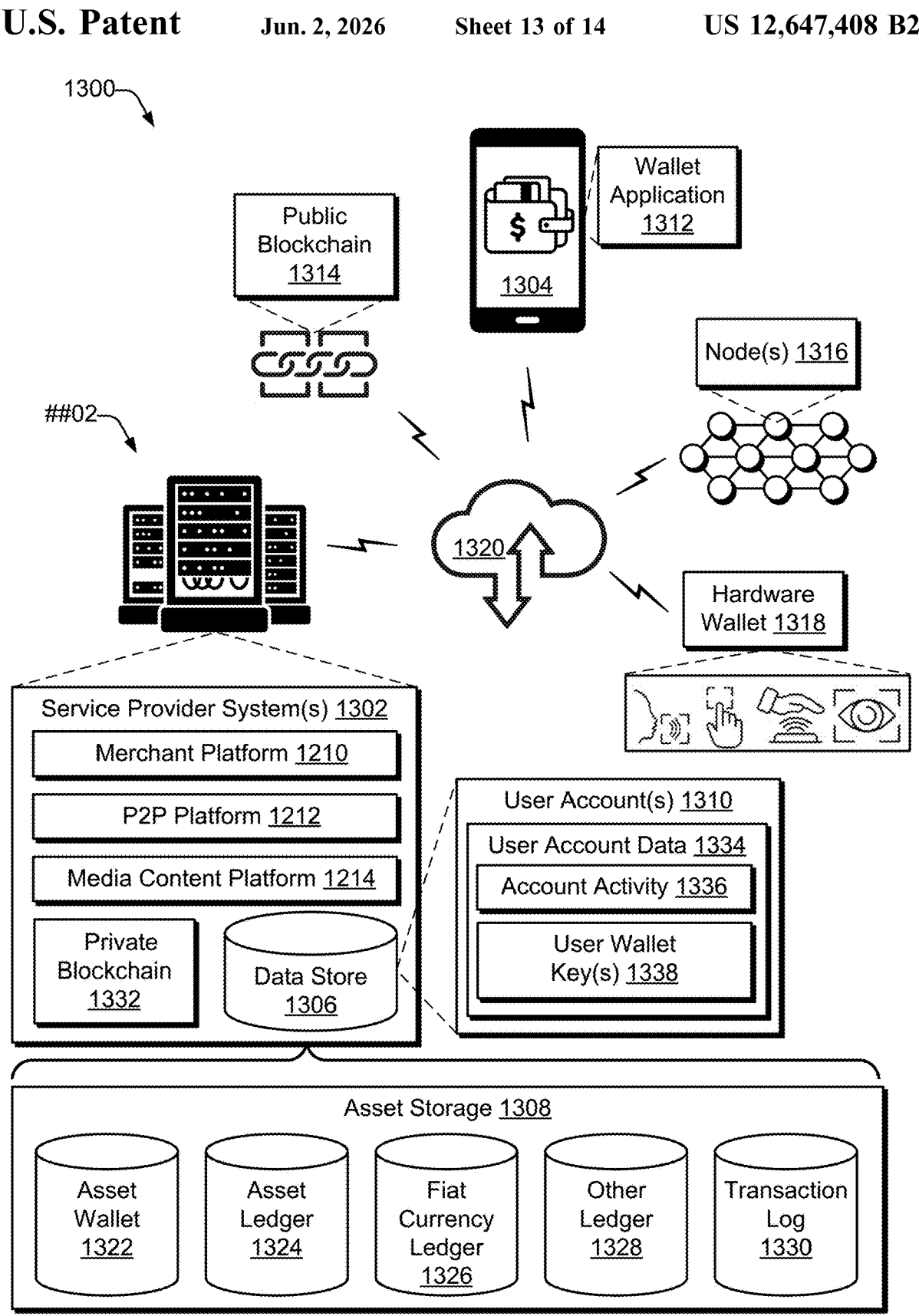
FIG. 13 is a non-limiting example illustrating an environment in which recommendation techniques described herein are performed in accordance with one or more implementations.

In some examples, the P2P platform 1212 can utilize a ledger system to track transfers of assets between users 1216. FIG. 13, below, provides additional details associated with such a ledger system. The ledger system can enable users 1216 to own fractional shares of assets that are not conventionally available. For instance, a user can own a fraction of a Bitcoin, an NFT, or a stock. Additional details are described herein.

In at least one example, the P2P platform 1212 can facilitate transfers and can send notifications related thereto to instances of the payment application 1226 executing on user device(s) of payee(s). As an example, the P2P platform 1212 can transfer assets from an account of a first user to an account of a second user and can send a notification to the user device 1206(B) of the second user for presentation via a user interface. The notification can indicate that a transfer is in process, a transfer is complete, or the like. In some examples, the P2P platform 1212 can send additional or alternative information to the instances of the payment application 1226 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the P2P platform 1212 funds the request to payee on behalf of the payor, to speed up the transfer process and compensate for lags that may be attributed to the payor's financial network.

In some examples, the P2P platform 1212 can trigger the peer-to-peer payment process through identification of a "payment proxy" having a particular syntax. The payment proxy is useable in lieu of payment data. That is, payment data and a payment proxy can be linked to, or otherwise associated with, a user account of a user and either can be used for making payments. In an example, the syntax can include a monetary currency indicator prefixing one or more alphanumeric characters (e.g., $Cash). The currency indicator operates as the tagging mechanism that indicates to the server(s) 1202 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol or other symbol could equally be used. In some examples, additional or alternative identifiers can be used to trigger the peer-to-peer payment process. For instance, email, telephone number, social media handles, artist or band names, and/or the like can be used to trigger and/or identify users of a peer-to-peer payment process.

In some examples, the peer-to-peer payment process can be initiated through instances of the payment application 1226 executing on the end user devices 1206. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can be a uniform resource locator (URL), which can include a payment proxy discussed above. The P2P platform 1212 can generate the landing page to enable the recipient to conveniently receive one or more payments from one or more senders.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through streaming of content, comments, posts, messages on electronic bulletin boards, messages on a social networking platform, and/or any other types of messages. In some examples, the content provider can be the service provider as described with reference to FIG. 12 or a third-party service provider associated with the server(s) 1208. In examples where the content provider is a third-party service provider, the server(s) 1208 can be accessible via one or more APIs 1218 or other integrations. In some examples, "forum" may also refer to an application or webpage of an e-commerce or retail organization that offers products and/or services. Such websites can provide an online "form" to complete before or after the products or services are added to a virtual cart. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be internal to the P2P platform 1212 (e.g., the P2P platform 1212 offers a chat or messaging service that is within the payment application or accessible via the payment application). In some examples, the messaging application can be external to the P2P platform 1212. (e.g., the messaging application is hosted by a third-party service provider associated with the server(s) 1208, which can be accessible via one or more of the APIs 1218 or other integrations). The messaging application can include, for example, a text messaging application for communication between phones (e.g., conventional mobile telephones or smartphones), or a cross-platform instant messaging application for smartphones and phones that use the Internet for communication.

Funds received from payments can be stored in stored balances that are linked to, or otherwise associated with, user accounts. In some examples, the P2P platform 1212 can enable users 1216 to perform banking transactions via instances of the payment application 1226. For example, users can configure direct deposits, recurring deposits, or other deposits (e.g., tax refunds, loans, etc.) for adding assets to their various ledgers/balances. In some examples, users can deposit physical cash via ATMs or other deposit sources, which can include merchants, such as those merchants that utilize the payment processing system described above. In some examples, the P2P platform 1212 can enable users to allocate funds between different accounts, sub-accounts, or balances (e.g., spending, saving, different assets, different currencies), etc. Further, users 1216 can configure bill pay, recurring payments, and/or the like using assets associated with their accounts. In some examples, the P2P platform 1212, with consent of the user, can track individual transactions made using the payment application and can utilize such transaction data to make personalized or customized recommendations, determine creditworthiness, generate tax documentation, and/or the like.

In addition to sending and/or receiving assets via peer-to-peer transactions, the P2P platform 1212 enables users to buy and/or sell assets via asset networks such as cryptocurrency networks, securities networks, and/or the like. In some examples, acquisition of such assets can be in whole or fractional shares. The ledger system described below with reference to FIG. 13 can enable such assets to be acquired in fractional shares and/or in real-time or near real-time (by delaying or omitting the need to buy/sell assets via asset networks or exchanges). In some examples, users can "gift" assets to other users, for example, by transferring cryptocurrency, stocks, or the like to one another.

In some examples, the P2P platform 1212 can enable users to link payment instruments to their user accounts. As a result, users can use their linked payment instruments to access funds in their accounts or balances. In some examples, the payment instrument can be a credit card, debit card, card linked to multiple accounts or balances via software or hardware, a fob or other object having payment data stored thereon, or the like. In some examples, the payment instrument can be a virtual payment instrument or a physical payment instrument. In some examples, the virtual payment instrument can be issued in real-time or for temporary usage. In some examples, the virtual payment instrument can have the same or different payment data as a corresponding physical payment instrument. Payment instruments can be customizable using a design user interface of the payment application. Such customization can enable users to select colors, stamps, images, text, or the like for surface(s) of their payment instruments. In some examples, users can draw or otherwise interact with the design user interface to personalize surface(s) of their payment instruments.

In some examples, users can associate incentives with their payment instruments. Incentives can be recommended to users based on user preferences (inferred or explicitly identified), geolocation, propensity to redeem, value, and/or the like. In some examples, incentives can be particular to individual merchants, types of merchants, types of transactions, and/or the like. In at least one example, when a user uses their payment instrument at a merchant or type of merchant associated with an incentive, or for a transaction type associated with an incentive, the P2P platform 1212 can automatically apply the incentive to the transaction. In some examples, users can gift other users "gift cards" that can be associated with payment instruments. That is, a user can transfer an amount of funds to another user and such funds can be associated with a condition (e.g., merchant, merchant type, transaction type, location, etc.) that, upon satisfaction, enables the amount of funds, or a portion thereof, to be applied to a transaction. In at least one example, when a user uses their payment instrument for a transaction that satisfies the condition, the P2P platform 1212 can automatically apply the amount of funds associated with the gift card to the transaction.

In some examples, users can configure their account such that when they use their payment instruments, the P2P platform 1212 can deposit an amount of funds into a savings account, investing account, bitcoin account, or the like.

In some examples, users can search for or browse other users, merchants, items, or the like via the payment application. In some examples, search results can be personalized and/or customized for the user (e.g., based on user data collected with consent of the user). In some examples, users can shop or otherwise purchase items from other users, merchants, or the like from within the payment application or via a deep link to a merchant application or website.

The P2P platform 1212 can offer primary and secondary accounts, wherein a primary account is a sponsor or other delegate of one or more secondary accounts. Such accounts can be useful for families, wherein a parent or other guardian is a sponsor or delegate to one or more child accounts, or where a child is a sponsor or delegate of an elderly parent's account. In some examples, primary accounts can establish limits on secondary accounts, such as spending limits, or the like. In some examples, the primary account owner is the user legally responsible for the account and their identity may be verifiable for secondary user accounts to perform certain transactions, such as buying/selling cryptocurrency or stocks. In some examples, one or more primary accounts and one or more secondary accounts can form a "group" with shared goals, such as saving, investing, or the like.

The P2P platform 1212 can present activity data via an activity user interface of the payment application. In some examples, activity can be presented by merchant, date, time, amount, or the like. In some examples, interactions between entities can be represented in conversational communications such that each interaction or transaction is represented as a message. In some examples, users can interact with individual messages and/or send/request funds from within such a conversational communication. In some examples, such conversational communications can represent conversations of a group of two or more users. Groups can be used to pool funds, obtain group discounts or incentives, or enable multiple users to participate in financial transactions together (e.g., group investing, group savings, etc.).

The P2P platform 1212 can offer a variety of financial training or learning opportunities. In some examples, such training or learning can be personalized for individual users, for example, based on user data and/or transaction data of the user that is obtained with consent of the user. In some examples, such user data and/or transaction data can be analyzed to make actionable recommendations with respect to optimizing financial health of users of the P2P platform 1212.

In some examples, components of the environment 1200 may be integrated to enable payments at the point-of-sale using assets associated with user accounts of the P2P platform 1212. As illustrated in the environment 1200, the components can communicate with one another via the network 1204, where one or more APIs 1218 or other functional components can be used to facilitate such communication.

In at least one example, an integration can enable a customer to participate in a transaction via their own computing device (e.g., user device 1206(B)) instead of interacting with a merchant device of a merchant, such as the seller device 1206(A). In such an example, the POS application 1220, associated with a payment processing platform and executable by the seller device 1206(A) of the merchant, can present a Quick Response (QR) code, or other code that can be used to identify a transaction (e.g., a transaction code), in association with a transaction between the customer and the merchant. The QR code, or other transaction code, can be provided to the POS application 1220 via an API 1218 associated with the peer-to-peer payment platform. In an example, the customer can utilize their own computing device, such as the user device 1206(B), to capture the QR code, or the other transaction code, and to provide an indication of the captured QR code, or other transaction code, to server(s) 1202.

Based at least in part on the integration of the peer-to-peer payment platform and the payment processing platform (e.g., via the API 1218), the server(s) 1202 of the seller platform 1210 can exchange communications with a payment application 1226 associated with the P2P platform 1212 and/or the POS application 1220 to process payment for the transaction using a peer-to-peer payment where the customer is a first "peer" and the merchant is a second "peer."

Based at least in part on receiving an indication of which payment method a user (e.g., customer or merchant) intends to use for a transaction, techniques described herein utilize an integration between the P2P platform 1212 and seller platform 1210 (which can be a first- or third-party integration) such that a QR code, or other transaction code, specific to the transaction can be used for providing transaction details, location details, customer details, or the like to a computing device of the customer, such as the user device 1206(B), to enable a contactless (peer-to-peer) payment for the transaction, and transferring funds from an account of the customer to an account of the merchant.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1206(B), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1220 and the payment application 1226, as described herein, can process a payment transaction by routing information input via the merchant application to the payment application for completing a "frictionless" payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. A customer computing device, such as the user device 1206(B), can be specially configured as a buyer-facing device having functionality similar to the functionality described above in the brick-and-mortar example.

In some examples, based at least in part on capturing the QR code, or other transaction code, the seller platform 1210 can provide transaction data to the P2P platform 1212 for presentation via the payment application 1226 on the computing device of the customer, such as the user device 1206B (B), to enable the customer to complete the transaction via their own computing device. In some examples, in response to receiving an indication that the QR code, or other transaction code, has been captured or otherwise interacted with via the customer computing device, the P2P platform 1212 can determine that the customer authorizes payment of the transaction using funds associated with a stored balance of the customer that is managed and/or maintained by the P2P platform 1212. Such authorization can be implicit such that the interaction with the transaction code can imply authorization of the customer. Alternatively or additionally, the P2P platform 1212 can request express authorization to process payment for the transaction using the funds associated with the stored balance and the customer can interact with the payment application to expressly authorize the settlement of the transaction. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the P2P platform 1212 can transfer funds from the stored balance of the customer to the seller platform 1210. In at least one example, the seller platform 1210 can deposit the funds, or a portion thereof, into a stored balance of the merchant that is managed and/or maintained by the seller platform 1210. In such an example, the seller platform 1210 can be a "peer" to the customer in a peer-to-peer transaction.

In some examples, techniques described herein can enable the customer to interact with the transaction after payment for the transaction has been settled. For example, in at least one example, the seller platform 1210 can cause a total amount of a transaction to be presented via a user interface associated with the payment application 1226 such that the customer can provide gratuity, feedback, loyalty information, or the like, via an interaction with the user interface. In another example, the seller platform 1210 can adjust a total amount of a transaction based on events during a shopping experience, such as adding or removing a charge to the total amount based on whether a media content item requested by the customer to be played during a shopping experience was in fact played. In some examples, because the customer has already authorized payment via the P2P platform 1212, if the customer inputs a tip and/or an event affecting the total amount of the transaction is triggered, the P2P platform 1212 can transfer additional funds, associated with the tip or event, to the seller platform 1210. This pre-authorization (or maintained authorization) of sorts can enable faster, more efficient payment processing when the tip is received and/or the event initiates the trigger. Further, the customer can provide feedback and/or loyalty information via the user interface presented by the payment application, which can be associated with the transaction. Using the pre-authorization techniques described herein results in fewer data transmissions and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1226 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. In some examples, the payment instrument can be associated with the P2P platform 1212 as described herein (e.g., a debit card linked to a stored balance of a customer) such that when the payment instrument is caused to interact with a payment reader, the seller platform 1210 can exchange communications with the P2P platform 1212 to authorize payment for a transaction and/or provision associated transaction data to a computing device of the customer associated with the transaction.

Turning now to media content functionality provided by the environment 1200, the media content platform 1214 can provide digital media to a content consumption device 1206(D) where playback may occur using "streaming." In examples, "streaming" media content involves encoding the media content and transmitting the encoded media content over the network 1204 to a media player or a media application executing on a device (e.g., via a speaker). The device then decodes and plays the media content while data is being received. In some cases, a buffer queues some of the data of the media content (e.g., audio data, video data, etc.) ahead of the media being played. During moments of network congestion, which leads to lower available bandwidth, less media content data is added to the buffer, which drains down as media content is being dequeued during streaming playback. However, during moments of high network bandwidth, the buffer is replenished, adding media content data to the buffer.

In at least one example, the media content platform 1214 can provide a digital media streaming service (e.g., subscription-based, non-subscription-based) that enables a content consumption device 1206(D) to stream and/or download digital media content via a listener application 1228 installed on the content consumption device 1206(D). For instance, the media content platform 1214 may comprise a digital audio streaming service (e.g., for music, podcasts, audiobooks, etc.), a digital video streaming service, and/or a streaming service that provides streaming of various different types of digital media content or multimedia. In such cases where digital media content items are downloaded and stored locally on the content consumption devices 1206(D), the listener application 1228 may verify access rights to the digital media content items at time intervals, for instance intermittently (e.g., when the content consumption device 1206(D) has a network connection with the media content platform 1214 via the network(s) 1204), and/or at regular intervals (e.g., daily, weekly, monthly, etc.). In examples, access rights to the digital media content items may be provided when a subscription to the media content platform 1214 is active, while access rights to the digital media content items may be withheld when the subscription to the media content platform 1214 is terminated. Enabling storage on the end user devices 1206 and subsequent access to digital media content items via the listener application 1228 provides the users 1216 with the ability to access the digital media content items "offline" such as when a connection to the media content platform 1214 via the network(s) 1204 is unavailable or unreliable.

In some examples, the media content platform 1214 may additionally or alternatively provide an artist management service that enables the users 1216 to manage aspects of artist business via an artist application 1230 installed on the artist device 1206(E), such as data analytics and management (e.g., listener data, consumer data, etc.), marketing, regulatory obligations, cash flow management, publishing, customer relationship management (CRM), social media, event coordination, industry communications, digital media content ingestion and storage, and so forth. In some cases, the users 1216 can have graduated access to the services, which can be based on a user type (e.g., artist, group member, personal manager, business manager, attorney, agent, etc.), risk tolerance, artist verification status, listener and/or viewer analytics (e.g., number of streams in a month), and so on. In some cases, multiple users 1216 may have access to a single user account via respective end user devices 1206, with the various users having different access privileges to services provided by the artist management service. In various scenarios, an artist can designate functions provided by the artist management service to different members of the team associated with the artist, thus granting the respective team members access to services suited to the skills of the individual team members.

In some cases, the artist application 1230 and the listener application 1228 may be distinct applications having differing user experiences and verification processes for access, such as illustrated in the environment 1200. For instance, the media content platform 1214 may request additional verification, such as a link to an artist website, a sample of an artist's work, a verified credential supplied by a third party, etc. to grant access to the artist application 1230 in addition to information requested to access the listener application 1228. Further, the artist application 1230 may provide the artist management services described herein, without the subscription-based digital media streaming services described herein, and vice versa. However, examples are also considered in which functionality provided by the artist application 1230 and the listener application 1228 partially or fully overlap, and/or where verification processes for access are substantially similar.

In at least some examples, the media content platform 1214 enables interaction between the users 1216 utilizing the listener application 1228 installed on the content consumption devices 1206(D), and the users 1216 utilizing the artist application 1230 installed on the artist devices 1206 (E). For example, the media content platform 1214 may provide interconnectivity between the subscription-based digital media streaming service and the artist management service. Functionality provided by the media content platform 1214 in such instances may include a communication channel between one or more of the users 1216 (e.g., a listener, fan, music supervisor, publisher, etc.) utilizing the listener application 1228 and another user (e.g., an artist) of the users 1216 utilizing the artist application 1230. The communication channel may include, for instance, a messaging platform (also referred to as a "messaging application" herein), a live streaming platform, a videoconferencing or teleconferencing platform, and/or a combination of these.

Additionally, in some cases, the media content platform 1214 may facilitate a resource transfer between the listener application 1228 and the artist application 1230. In an example, the media content platform 1214 may direct a resource, such as a portion of a subscription fee paid by one of the users 1216 designated as a listener, to one or more of the users 1216 designated as artists based on a number of instances that the listening user consumed (e.g., streamed, downloaded, etc.) content created by respective ones of the artist users. Alternatively or additionally, the media content platform 1214 may direct a resource, such as funds, from an account associated with a listening user to an account associated with an artist user (or vice versa), in accordance with transfers between accounts as described herein. The media content platform 1214 may facilitate resource transfers in examples such as merchandise purchases, event ticket purchases, "tipping" an artist, payments for royalties or other fees, and so forth.

In some examples, the media content platform 1214 enables interaction between individual ones of the users 1216 with one another via the listener application 1228 installed on the content consumption device 1206(D) and other of the content consumption devices 1206(D) via a communication channel as described above. In an example, the listener application 1228 may provide functionality via a communication channel for a user to stream an individual digital media item, a playlist, or the like to an audience comprising other ones of the content consumption devices 1206(D). Alternatively or additionally, the communication channel may facilitate sharing of individual digital media items, playlists, user and/or artist profiles, and the like between the users 1216 via messages, uniform resource locators (URLs), quick response (QR) codes, and so forth.

In some cases, the media content platform 1214 enables interaction between individual ones of the users 1216 with one another via the artist application 1230 installed on the artist device 1206(E) and other of the artist devices 1206 via a communication channel as described above. In some instances, the media content platform 1214 may provide recommendations for a particular user indicating which of the other users 1216 to communicate with. Such a recommendation may be based on a similarity (or dissimilarity) of content created by two or more of the users 1216, an overlap (or lack thereof) of audience members of the users 1216, a geographic location of the users 1216, a coinciding event location of the users 1216, and so forth. In some examples, a user may input parameters for a desired connection via the artist application 1230, and the media content platform 1214 may filter which of the users 1216 to surface for recommendations to the user based on the input parameters. Alternatively or additionally, the media content platform 1214 may implement one or more machine learning models to filter which of the users 1216 to surface for recommendations to the user. The recommendations provided by the media content platform 1214 may be data driven and thus increase relevance of communications presented to the users 1216 and reduce unsolicited communications that may be received by the users 1216.

The media content platform 1214 may interact with the server(s) 1208 associated with the third-party service providers to, for instance, ingest digital media items, report digital media consumption data, pay royalties, and the like. In some examples, the server(s) 1208 may be accessible by the media content platform 1214 via one or more APIs 1218 or other integrations. In some cases, the third-party service provider may be a digital media content provider (e.g., a record label, a performance rights organization (PRO), an independent artist, etc.). In such cases, the media content platform 1214 may receive digital media content items from the server(s) 1208, along with metadata associated with the digital media content items. The metadata, in some instances, may indicate individual contributors to a digital media content item such as an artist or artists, a songwriter (e.g., a composer, lyricist, author, etc.), a producer (which may further include a co-producer, a mastering engineer, a mixing engineer, a recording engineer, an arranger, a programmer, etc.), a musician (e.g., instrumentalist, vocalist, etc.), a visual artist, and so forth, with an indication of the role of the individual contributor. Alternatively or additionally, the metadata may indicate information such as release date, track title, track duration, clean or explicit version, jurisdiction information, and the like. The media content platform 1214 may use the metadata to associate the digital media content item as being created by a particular user, to provide search results to the users 1216, to generate playlists, and so forth. Further, the media content platform 1214 may provide payments (e.g., royalties) to the third-party service provider based on a number of streams and/or downloads of individual digital media content items by the users via the listener application 1228.

Techniques described herein are directed to services provided via a distributed system of end user devices 1206 that are in communication with server(s) 1202 of the service provider. That is, techniques described herein are directed to a specific implementation—or, a practical application—of utilizing a distributed system of end user devices 1206 that are in communication with server(s) 1202 of the seller platform 1210, the P2P platform 1212, and/or the media content platform 1214 to perform a variety of services, as described above. The unconventional configuration of the distributed system described herein enables the server(s) 1202 that are remotely-located from end-users (e.g., users 1216) to intelligently offer services based on aggregated data associated with the end-users, such as the users 1216 (e.g., data associated with multiple, different merchants and/or multiple, different buyers; data associated with multiple different listeners and/or multiple different artists, etc.), in some examples, in near-real time. Accordingly, techniques described herein are directed to a particular arrangement of elements that offer technical improvements over conventional techniques for performing payment processing services, P2P payment services, media content services, and the like. For small business owners and artists in particular, the business environment is typically fragmented and relies on unrelated tools and programs, making it difficult for an owner or an artist to manually consolidate and view such data. The techniques described herein constantly or periodically monitor disparate and distinct user accounts, e.g., accounts within the control of the seller platform 1210, the P2P platform 1212, and/or the media content platform 1214, and those outside of the control of these service providers, to track the standing (payables, receivables, payroll, invoices, appointments, capital, balances, collaborations, etc.) of the users 1216. The techniques herein provide a consolidated view of a user's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services, P2P payment services, media content services, and/or additional or alternative services described herein. In some implementations, the distributed system is capable of applying the intelligence derived from an existing user base to a new user, thereby making the onboarding experience for the new user personalized and frictionless when compared to traditional onboarding methods. Further, models or algorithms that are used to implement techniques described herein may be retrained over time to improve outcomes for subsequent scenarios based on outcomes of previous scenarios. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1216 and end user devices 1206. Furthermore, such features are changed dynamically based on the profiles of the users involved interacting with the GUIs. As such, techniques described herein are directed to improvements to computing systems.

The seller platform 1210, the P2P platform 1212, and/or the media content platform 1214 are capable of providing additional or alternative services, and the services described above are offered as a sampling of services. In at least one example, the seller platform 1210, the P2P platform 1212, and/or the media content platform 1214 can exchange data with the server(s) 1208 associated with third-party service providers. Such third-party service providers can provide information that enables the seller platform 1210, the P2P platform 1212, and/or the media content platform 1214 to provide services, such as those described above. In additional or alternative examples, such third-party service providers can access services of the seller platform 1210, the P2P platform 1212, and/or the media content platform 1214. That is, in some examples, the third-party service providers can be subscribers, or otherwise access, services of the seller platform 1210, the P2P platform 1212, and/or the media content platform 1214.

FIG. 13 illustrates an example environment 1300 including a service provider system 1302 which may be associated with the server(s) 1202 of FIG. 12. The environment 1300 may also include a user device 1304, which may correspond to any of the end user devices 1206 described in relation to FIG. 12. In examples, the service provider system 1302 may include one or a combination of the seller platform 1210, the P2P platform 1212, or the media content platform 1214, as well as one or more data store(s) 1306 that can store assets in an asset storage 1308, as well as data in user account(s) 1310. In some examples, the environment 1300 may also include a public blockchain 1314, one or more nodes 1316, and/or a hardware wallet 1318. The service provider system 1302, the user device 1304, public blockchain 1314, the node(s) 1316, and the hardware wallet 1318 may be connected and able to communicate via one or more networks 1320, which may have the same or similar functionality described in relation to the network 1204 of FIG. 12.

In some examples, user account(s) 1310 can include merchant account(s), customer account(s), media content subscriber account(s), artist account(s), and so forth. In at least one example, the asset storage 1308 can be used to record whether individual assets are registered to a user account 1310. For example, the asset storage 1308 can include asset wallet(s) 1322 for storing records of assets owned by the service provider system 1302, such as cryptocurrency, securities, NFTs, or the like, and communicating with one or more asset networks, such as cryptocurrency networks, NFT networks, securities networks, or the like. In some examples, the asset network can be a first-party network or a third-party network, such as a cryptocurrency exchange or the stock market. In examples where the asset network is a third-party network, the server(s) 1208 of FIG. 12 can be associated therewith.

The asset wallet 1322 can be associated with one or more addresses and can vary addresses used to acquire assets (e.g., from the asset network(s)) so that its holdings are represented under a variety of addresses on the asset network. In examples where the service provider system 1302 has holdings of cryptocurrency (e.g., in the asset wallet 1322), a user can acquire cryptocurrency directly from the service provider system 1302. In some examples, the service provider system 1302 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In some scenarios, the buying and selling of cryptocurrency, and therefore the associated updating of the public ledger of an asset network can be separate from a customer-merchant transaction or a peer-to-peer transaction, and therefore not necessarily time-sensitive. This can enable batching transactions to reduce computational resources and/or costs. The service provider system 1302 can provide the same or similar functionality for securities or other assets.

The asset storage 1308 may contain ledgers that store records of assignments of assets to users 1216. Specifically, the asset storage 1308 may include asset ledger 1324, fiat currency ledger 1326, and/or other ledger(s) 1328, which can be used to record transfers of assets between users 1216 and/or one or more third-parties (e.g., merchant network(s), payment card network(s), ACH network(s), equities network(s), the asset network, securities networks, etc.). In doing so, the asset storage 1308 can maintain a running balance of assets managed by the service provider system 1302. The ledger(s) of the asset storage 1308 can further indicate some of the running balance for individual ledger(s) stored in the asset storage 1308 are assigned or registered to one or more user account(s) 1310.

In at least one example, the asset storage 1308 can include transaction logs 1330, which can include, as transaction data, records of past transactions involving the service provider system 1302 and/or the user account 1310. In some examples, the data store(s) 1306 can store a private blockchain 1332. A private blockchain 1332 can function to record sender addresses, recipient addresses, public keys, values of cryptocurrency transferred, and/or can be used to verify ownership of cryptocurrency tokens to be transferred. In some examples, the service provider system 1302 can record transactions involving cryptocurrency until the number of transactions has exceeded a determined limit (e.g., number of transactions, storage space allocation, etc.). Based at least in part on determining that the limit has been reached, the service provider system 1302 can publish the transactions in the private blockchain 1332 to the public blockchain 1314 (e.g., associated with the asset network), where miners can verify the transactions and record the transactions to blocks on the public blockchain 1314. In at least one example, the service provider system 1302 can participate as miner(s) at least for transactions to which the respective platform is a party to, to be posted to the public blockchain 1314.

In some cases, the data store(s) 1306 can store and/or manage multiple user accounts, an example of which is described in relation to the user account 1310. In at least one example, the user account 1310 can include user account data 1334, which can include, but is not limited to, data associated with user identifying information (e.g., name, phone number, address, artist or band name, verified credentials, etc.), user identifier(s) (e.g., alphanumeric identifiers, etc.), user preferences (e.g., learned or user-specified), purchase history data (e.g., identifying one or more items purchased (and respective item information), subscription tier information, etc.), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1334 can include account activity 1336 and user wallet key(s) 1338. In some examples, the user wallet key(s) 1338 can include a public-private key-pair and a respective address associated with the asset network or other asset networks. In some examples, the user wallet key(s) 1338 may include one or more key pairs, which can be unique to the asset network or other asset networks.

In addition to the user account data 1334, the user account 1310 can include ledger(s) for account(s) managed by the service provider system 1302, for the user. For example, the user account 1310 may include an asset ledger 1324, a fiat currency ledger 1326, and/or one or more other ledgers 1328. The ledger(s) can indicate that a corresponding user utilizes the service provider system 1302 to manage corresponding accounts (e.g., a cryptocurrency account, a securities account, a fiat currency account, an artist account, etc.). It should be noted that in some examples, the ledger(s) can be logical ledger(s) and the data can be represented in a single database. In some examples, individual ones of the ledger(s), or portions thereof, can be maintained by the service provider system 1302.

In some examples, the asset ledger 1324 can store a balance for each of one or more cryptocurrencies (e.g., Bitcoin, Ethereum, Litecoin, etc.) registered to the user account 1310. In at least one example, the asset ledger 1324 can further record transactions of cryptocurrency assets associated with the user account 1310. For example, the user account 1310 can receive cryptocurrency from the asset network using the user wallet key(s) 1338. In some examples, the user wallet key(s) 1338 may be generated for the user upon request. User wallet key(s) 1338 can be requested by the user in order to send, exchange, or otherwise control the balance of cryptocurrency held by the service provider system 1302 (e.g., in the asset wallet 1322) and registered to the user. In some examples, the user wallet key(s) 1338 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider system 1302 and the value is credited as a balance in asset ledger 1324), by purchasing currency in the form associated with the account using currency in a different form (e.g., buying a value of cryptocurrency from the service provider system 1302 using a value of fiat currency reflected in fiat currency ledger 1326, and crediting the value of cryptocurrency in asset ledger 1324), or by conducting a transaction with another user (customer or merchant) of the service provider system 1302 wherein the account receives incoming currency (which can be in the form associated with the account or a different form, in which the incoming currency may be converted to the form associated with the account).

With specific reference to funding a cryptocurrency account, a user may have a balance of cryptocurrency stored in another cryptocurrency wallet. In some examples, the other cryptocurrency wallet can be associated with a third-party unrelated to the service provider system 1302 (i.e., an external account). Such a transaction can request that the user to transfer an amount of the cryptocurrency in a message signed by user's private key to an address provided by the service provider system 1302. In at least one example, the transaction can be sent to miners to bundle the transaction into a block of transactions and to verify the authenticity of the transactions in the block. Once a miner has verified the block, the block is written to the public blockchain 1314 where the service provider system 1302 can then verify that the transaction has been confirmed and can credit the user's asset ledger 1324 with the transferred amount. When an account is funded by transferring cryptocurrency from a third-party cryptocurrency wallet, an update can be made to the public blockchain 1314. In some cases, this update of the public blockchain 1314 need not take place at a time-critical moment, such as when a transaction is being processed by a merchant in store or online.

In some examples, a user can purchase cryptocurrency to fund their cryptocurrency account. In some examples, the user can purchase cryptocurrency through services offered by the service provider system 1302. As described above, in some examples, the service provider system 1302 can acquire cryptocurrency from a third-party source. In examples where the service provider system 1302 has its own cryptocurrency assets, cryptocurrency transferred in a transaction (e.g., data with address provided for receipt of transaction and a balance of cryptocurrency transferred in the transaction) can be stored in an asset wallet 1322 associated with the service provider system 1302. In at least one example, the service provider system 1302 can credit the asset ledger 1324 of the user. Additionally, while the service provider system 1302 recognizes that the user retains the value of the transferred cryptocurrency through crediting the asset ledger 1324, an inspection of the blockchain will show the cryptocurrency as having been transferred to the service provider system 1302. In some examples, the asset wallet 1322 can be associated with many different addresses. In such examples, an inspection of the blockchain may not necessarily associate all cryptocurrency stored in asset wallet 1322 as belonging to the same entity. The presence of a private ledger used for real-time transactions and maintained by the service provider system 1302, combined with updates to the public ledger at other times, allows for extremely fast transactions using cryptocurrency to be achieved. In some examples, the "private ledger" can refer to the asset ledger 1324, which in some examples, can utilize the private blockchain 1332, as described herein. The "public ledger" can correspond to the public blockchain 1314 associated with the asset network.

In at least one example, an asset ledger 1324, fiat currency ledger 1326, or the like associated with the user account 1310 can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1324. In some examples, a user can receive fiat currency or another currency in the form of payment for a transaction with another user. In at least one example, at least a portion of such funds can be converted into cryptocurrency by the service provider system 1302 and used to fund the asset ledger 1324 of the user.

In examples, a user can also have an account in U.S. dollars, which can be tracked, for example, via the fiat currency ledger 1326. Such an account can be funded by transferring money from a bank account at a third-party bank to an account maintained by the service provider system 1302 as is conventionally known. In some examples, a user can receive fiat currency in the form of payment for a transaction with another user. In such examples, at least a portion of such funds can be used to fund the fiat currency ledger 1326.

In some examples, a user can have one or more internal payment cards registered with the service provider system 1302. Internal payment cards can be linked to one or more of the accounts associated with the user account 1310. In some embodiments, options with respect to internal payment cards can be adjusted and managed using an application (e.g., the payment application 1226, a wallet application 1312, etc.).

In at least one example, the user account 1310 can be associated with the asset wallet accessible via a wallet application 1312 of the user device 1304, or a stored balance for use in payment transactions, peer-to-peer transactions, payroll payments, etc. In at least one example, the asset wallet 1322 can store data indicating an address provided for receipt of a cryptocurrency transaction. In at least one example, the balance of the asset wallet 1322 can be based at least in part on a balance of the asset ledger 1324. In at least one example, funds availed via the asset wallet 1322 can be stored in the asset wallet 1322. Funds availed via the asset wallet 1322 can be tracked via the asset ledger 1324.

The asset wallet 1322, however, can be associated with additional cryptocurrency funds.

In at least one example, when the service provider system 1302 includes a private blockchain 1332 for recording and validating cryptocurrency transactions, the asset wallet 1322 can be used instead of, or in addition to, the asset ledger 1324. For example, a merchant can provide the address of the asset wallet 1322 for receiving payments. In an example where a customer is paying in cryptocurrency and the customer has their own cryptocurrency wallet account associated with the service provider system 1302, the customer can send a message signed by its private key including its wallet address (i.e., of the customer) and identifying the cryptocurrency and value to be transferred to the merchant's asset wallet 1322. The service provider system 1302 can complete the transaction by reducing the cryptocurrency balance in the customer's cryptocurrency wallet and increasing the cryptocurrency balance in the merchant's asset wallet 1322. In addition to recording the transaction in the respective cryptocurrency wallets, the transaction can be recorded in the private blockchain 1332 and the transaction can be confirmed. A user can perform a similar transaction with cryptocurrency in a peer-to-peer transaction as described above.

While the asset ledger 1324 and/or asset wallet 1322 are each described above with reference to cryptocurrency, the asset ledger 1324 and/or asset wallet 1322 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider system 1302 is an aspect of the technology disclosed that enables technical advantages of increased processing speed and improved security.

The description of the environment 1300 above generally relates to a centralized service provider that at least partially facilitates storing and managing assets in the data store 1306. However, the environment 1300 may also facilitate decentralized storage and management of assets alternatively or in addition to centralized storage and management as described above. For instance, the environment 1300 may include a decentralized platform implemented using a plurality of nodes (e.g., web nodes), an example of which is illustrated as node 1316. The node 1316 is representative of a computer or other device tasked with validating transactions and/or maintaining a copy of a blockchain ledger, such as a ledger associated with the public blockchain 1314. The decentralized platform may be implemented via the environment 1300 through use of decentralized identifiers and verifiable credentials that are stored and managed by user devices 1304. A decentralized identifier is configured as a self-owned identifier that supports decentralized authentication and routing. A self-owned identifier in a blockchain network is a unique identifier that is owned and controlled by an individual entity on the blockchain, as contrasted with an entity controlled by a centralized authority (e.g., the service provider system 1302). The decentralized identity referenced by a decentralized identifier gives an entity control over what data can be accessed, stored, modified, and so forth by other entities, such as the service provider system 1302.

The node 1316, as representative of one of a plurality of decentralized nodes (e.g., decentralized web nodes), supports data storage and relays that allows entities, service provider systems, individuals, organizations and so forth to send, store, and receive encrypted or public messages and data. The node 1316 is universally addressable and is "crawlable" using data addressing in relation to the decentralized identifiers. The node 1316 is also configured to support decentralized replication of data across the nodes that is consistent across multiple nodes over time through continued data communication between the nodes in the decentralized platform. The node 1316 is configurable to support secure encryption through use of a cryptographic key associated with an individual's decentralized identifier and support semantic discovery to discover different forms of published data.

Verifiable credentials are an open standard for digital credentials, and employ a data format for cryptographic presentation and verification of claims. A verifiable credential represents an indication of trust of a piece of information related to an entity. For example, a verifiable credential indicates that the issuer of the verifiable credential trusts the holder of the verifiable credential; the holder trusts a verifier of the verifiable credential; and that the verifier trusts the issuer. Verifiable credentials may be issued by anyone, about anything, and can be presented to and verified by everyone granted access to the verifiable credential. Accordingly, a user of the user device 1304 may be an issuer, a holder, and/or a verifier, as can the service provider system 1302.

In some examples, the user device 1304 may implement a wallet application 1312 configured to manage decentralized identifiers and/or verifiable credentials. For instance, the wallet application 1312 may provide a user interface for implementation of access controls to various data associated with the decentralized identifier by the service provider system 1302, to other user devices, and so forth. Additionally, the wallet application 1312 may be configured to provide functionality for resource transfers (e.g., cryptocurrency, fiat currency, etc.) with the service provider system 1302, other user devices, and the like, based on techniques described herein.

In some examples, the hardware wallet 1318 may store cryptocurrency assets in combination with the wallet application 1312 and the service provider system 1302. For instance, the hardware wallet 1318, the wallet application 1312, and the service provider system 1302 may each store a respective, different private key, where a transaction with the cryptocurrency assets is signed by at least two of the three private keys. The user interface provided by the wallet application 1312 may allow a user to request a transaction. The wallet application 1312 may then sign the transaction with the private key of the wallet application 1312, have either the hardware wallet 1318 or the service provider system 1302 use a second of the three private keys to sign the transaction, and then provide the transaction with two signatures to the public blockchain 1314 for processing.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 12 and for client device 106.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, a speaker device, an automobile or other vehicle type, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below. The user device 1402 may be representative of, and provide functionality for, the user devices 1206 described in relation to FIG. 12.

In the illustrated example, the user device 1402 includes one or more processors 1408, one or more computer-readable media 1410, one or more communication interface(s) 1412, one or more input/output (I/O) devices 1414, a display 1416, and sensor(s) 1418. The user device 1402 is also configurable to include one or more encoders and one or more decoders.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, a user can interact with the user interface via touch input, spoken input, gesture, or any other type of input, e.g., for user interfaces as described in relation to FIGS. 3, 5, 7, and 8. The word "input" is also used to describe "contextual" input that may not be directly provided by the user via the user interface 1420. For example, user's interactions with the user interface 1420 are analyzed using, e.g., natural language processing techniques, user movement tracking techniques, eye tracking techniques, etc. to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtual reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. In some examples, the user device 1402 may not include the display 1416, and information can be presented by other means, such as aurally, haptically, etc.

In addition, the user device 1402 can include sensor(s) 1418. The sensor(s) 1418 can include a global positioning system ("GPS") device able to indicate location information. Further, the sensor(s) 1418 can include, but are not limited to, an accelerometer, gyroscope, compass, proximity sensor, camera, microphone, and/or a switch.

In some examples, the GPS device can be used to identify a location of a user. In at least one example, the location of the user can be used by the seller platform 1210, the P2P platform 1212, and/or the media content platform 1214, described above, to provide one or more services. That is, in some examples, the service provider can implement geofencing to provide particular services to users by the seller platform 1210, the P2P platform 1212, and/or the media content platform 1214.

In examples, the user device 1402 includes a codec system, which may comprise an encoder and/or a decoder. The encoder is configured to encode a data stream or signal from an analog signal (e.g., an analog audio signal, an analog video signal, etc.) to a digital signal for transmission or storage. The decoder is configured to convert the digital signal back to an analog signal, such as for playback or editing. In some cases, the encoder may be configured to encode the data stream or analog signal in an encrypted format, and the decoder may accordingly be configured to decrypt the digital signal as part of the decoding process (e.g., using a cryptographic key). Additionally, in some examples, the encoder may compress data to reduce transmission bandwidth and/or storage space for the digital signal. One example of a compression codec system is a lossless codec, in which the digital data stream is a compressed format of the original data stream, but retains the information present in the original data stream. Another example of a compression codec system is a lossy codec which reduces the quality of the digital data stream but can increase the compression of the data stream relative to lossless codec systems. The codec system comprising the encoder and/or the decoder may be specialized to accomplish various different objectives, such as to preserve motion, preserve color, minimize latency, maintain fidelity, minimize bit-rate, optimize for different output device types, maintain synchronization of audio and video (e.g., using a metadata synchronization data stream), and so on. Although not explicitly illustrated in the example system 1400, the server 1404 may include an encoder and/or a decoder as well.

Additionally, the user device 1402 can include various other components that are not shown, examples of which include removable storage, a power source, such as a battery and power control unit, a barcode scanner, a printer, a cash drawer, and so forth.

In addition, as described in relation to FIG. 12, the user device 1402 can include, be connectable to, or otherwise be coupled to a reader device 1426, for reading payment instruments and/or identifiers associated with payment objects. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data from various types of payment instruments. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe, a dip, or a tap to obtain payment data associated with a customer. Additionally or optionally, the reader device 1426 may also include a biometric sensor to receive and process biometric characteristics and process them as payment instruments, given that such biometric characteristics are registered with the payment service and connected to a financial account with a bank server. The reader device 1426 may include processing unit(s), computer-readable media, a reader chip, a transaction chip, a timer, a clock, a network interface, a power supply, and so on. That is, the reader device 1426 may include any of the computing components described herein with reference to the user device 1402 to implement the functionality provided by the reader device 1426.

In examples, the reader device 1426 includes a reader chip, which may perform functionality to control the power supply, among other functionality of the reader device 1426. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The reader device 1426 may also include a transaction chip that may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. The transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While the user device 1402, which can be a POS terminal, and the reader device 1426 are shown as separate devices, in additional or alternative examples, the user device 1402 and the reader device 1426 can be part of a single device, which may be a battery-operated device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the seller platform 1210, the P2P platform 1212, and/or the media content platform 1214. Functional components stored in the computer-readable media 1430 can optionally include a merchant component 1436, a training component 1438, and one or more other components and data 1440. The computer-readable media 1430 can additionally include an operating system 1442 for controlling and managing various functions of the server(s) 1404.

The merchant component 1436 can be configured to receive transaction data from POS systems, such as the POS system 1224 described above with reference to FIG. 12. The merchant component 1436 can transmit requests (e.g., authorization, capture, settlement, etc.) to payment service server computing device(s) to facilitate POS transactions between merchants and customers. The merchant component 1436 can communicate the successes or failures of the POS transactions to the POS systems.

The training component 1438 can be configured to train models using machine-learning mechanisms, as well as retrain the models to improve outputs provided by the models based on feedback received over time. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include functionality of which is described above. Further, the one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, as described herein.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406. In at least one example, the datastore 1444 can store user profiles, which can include merchant profiles, customer profiles, artist profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, media content consumption data (e.g., number of streams of media content and by which artists, direct artist payouts, playlists generated or "favorited," durations of listening and/or watching individual media content items, actions performed while consuming media content (e.g., skips, repeats, volume changes, etc.), locations at which media content is consumed, devices used to consume media content, activities during which media content is consumed, etc.), etc.

Artist profiles can store data including, but not limited to, artist information (e.g., artist's performance or stage name, band name, artist's legal name, record label, phone number, address, social media handles, website address, banking information, etc.), artist preferences (e.g., learned or artist-specified), media content (and/or associated data) at least partially attributed to the artist (e.g., songs, videos, artists in a same genre or having shared listeners, etc.), event data (e.g., tour dates, appearance dates, appointments, etc.), financial data (e.g., advance data, recoupment data, royalty data, payouts data, etc.), payroll data (e.g., employees, contractors, venues, payroll frequency, etc.), listening data (e.g., number of streams on media content platform(s), listening trends, etc.), fan data (number of followers on media content platform(s), number of followers on social media platform(s), etc.), reservations data (e.g., venue reservations, studio recording reservations, previous reservations, upcoming (scheduled) reservations, reservation duration, interactions associated with such reservations, etc.), inventory data (e.g., merchandise inventory), customer service data, and so forth.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described in the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A method comprising:
accessing, by a client device, an item of digital content having multiple contributors at a decentralized node associated with the client device, the decentralized node being one of multiple decentralized nodes in a decentralized network;
displaying, at the client device, a user interface including one or more roles that are selectable to assign a decentralized identifier associated with the decentralized node as a contributor of the multiple contributors to the one or more roles, wherein the displaying includes displaying multiple portions of the digital content;
receiving a selection of a role of the one or more roles to assign the decentralized identifier as a contributor to the item of digital content, wherein the receiving of the selection of the role includes assigning the decentralized identifier to a respective portion of the multiple portions;
parsing the item of digital content to form a plurality of portions such that a contribution may be identified directly with a corresponding portion of the digital content;
based on receiving the selection, sending a request to a credential issuer system for a verifiable credential to verify that the decentralized identifier is the contributor to the selected role;
receiving the verifiable credential from the credential issuer system, wherein the verifiable credential includes a cryptographic proof that is usable to verify authenticity by the credential issuer system;
storing the verifiable credential and the decentralized identifier as the contributor to the role in metadata associated with the item of digital content at the decentralized node; and
transmitting, in response to receiving a request to access the contributor to the role of the digital content item, the metadata identifying the decentralized identifier as the contributor to the role and the verifiable credential.

2. The method as described in claim 1, wherein the sending of the request includes sending the request to another decentralized node of the decentralized nodes associated with the credential issuer system.

3. The method as described in claim 1, further comprising identifying the one or more roles from multiple roles based on the item of digital content.

4. The method as described in claim 3, wherein the identifying is performed using a machine-learning model.

5. The method as described in claim 1, further comprising identifying a candidate contributor from the item of digital content and wherein the displaying includes displaying a representation of the candidate contributor.

6. The method as described in claim 5, wherein the identifying is performed using a machine-learning model.

7. The method as described in claim 5, wherein the identifying includes identifying another contributor assigned in the metadata to the item of digital content.

8. The method as described in claim 1, further comprising storing an additional verifiable credential from the contributor as part of the metadata so as to self-sign the item of digital content.

9. The method as described in claim 1, wherein the one or more roles include a recording studio, record label, contributing artist, composer, songwriter, agent, manufacturer, or engineer.

10. A computing device comprising:

a processing device; and a computer-readable storage medium storing instructions that, responsive to executing by the processing device, causes the processing device to perform operations including:

obtaining digital content;

parsing the digital content to form a plurality of portions such that a contribution may be identified directly with a corresponding portion of the digital content;

identifying a decentralized identifier and a verifiable credential both associated with a respective portion of the plurality of portions, wherein each portion corresponds to a contribution by an entity associated with the decentralized identifier, wherein the verifiable credential includes a cryptographic proof that is usable to verify authenticity by a credential issuer system, and wherein the decentralized identifier is resolvable to identify a personal datastore maintained at a respective node as associated with the entity, the respective node being one of a decentralized network of nodes individually configured to store, receive, and transmit data; and displaying representations of decentralized identifiers, each representation being indicative of a respective entity and a corresponding verifiable credential validating a relationship of the respective entity with a respective portion.

11. The computing device as described in claim 10, wherein the identifying includes parsing metadata associated with the digital content.

12. The computing device as described in claim 10, further comprising obtaining data associated with the respective entity from the personal datastore.

13. A method comprising:

receiving, by a processing device, an input specifying a decentralized identifier associated with a contributor to creation of an item of digital content, wherein the decentralized identifier is resolvable to a node of a decentralized network of nodes, the node associated with a personal datastore of the contributor;

parsing the item of digital content to form a plurality of portions such that a contribution may be identified directly with a corresponding portion of the digital content;

generating, by the processing device in response to the input, a request for transmitting to a credential issuer system to verify a contribution of the contributor associated with the decentralized identifier to creation of the item of content;

receiving, by the processing device, a verifiable credential from the credential issuer system, the verifiable credential verifying the contribution of the contributor to creation of the item of digital content, wherein the verifiable credential includes a cryptographic proof that is usable to verify authenticity by the credential issuer system; and storing, by the processing device, the decentralized identifier and the verifiable credential as part of metadata associated with the item of digital content.

14. The method as described in claim 13, wherein the input also identifies the credential issuer system.

15. The method as described in claim 14, wherein the input identifies the credential issuer system using another decentralized identifier that is resolvable to a node of a decentralized network of nodes.

* * * * *